(12) United States Patent
Christensen et al.

(10) Patent No.: US 8,939,675 B2
(45) Date of Patent: Jan. 27, 2015

(54) BARRIER SYSTEMS WITH INTERLOCKING FLAG

(71) Applicant: Off The Wall Products, LLC, Salt Lake City, UT (US)

(72) Inventors: Marc E. Christensen, Salt Lake City, UT (US); James Schaffner, Ogden, UT (US)

(73) Assignee: Off the Wall Products, LLC, Salt Lake City, UT (US)

( * ) Notice: Subject to any disclaimer, the term of this patent is extended or adjusted under 35 U.S.C. 154(b) by 0 days.

(21) Appl. No.: 14/336,161

(22) Filed: Jul. 21, 2014

(65) Prior Publication Data

US 2014/0328620 A1 Nov. 6, 2014

Related U.S. Application Data

(60) Division of application No. 13/436,014, filed on Mar. 30, 2012, now Pat. No. 8,808,600, which is a continuation-in-part of application No. 12/646,572, filed on Dec. 23, 2009, now Pat. No. 8,167,512.

(51) Int. Cl.
    *E01F 13/02* (2006.01)
(52) U.S. Cl.
    CPC .............. *E01F 13/02* (2013.01); *E01F 13/022* (2013.01)
    USPC ................................... 404/6; 404/9; 256/13.1
(58) Field of Classification Search
    CPC ................................ E01F 13/02; E01F 13/022
    USPC ............................................ 404/6; 256/13.1
    See application file for complete search history.

(56) References Cited

U.S. PATENT DOCUMENTS

| 3,537,687 A | 11/1970 | Adelman |
| 4,040,759 A | 8/1977 | Skalle |
| 4,143,857 A | 3/1979 | Weiner |
| 4,498,660 A | 2/1985 | Brema et al. |
| 4,614,181 A | 9/1986 | Karlsson |
| 4,681,302 A | 7/1987 | Thompson |
| 4,854,767 A | 8/1989 | Sasaki |

(Continued)

FOREIGN PATENT DOCUMENTS

| AU | B-50241/93 | 8/1994 |
| EP | 0 550 362 A1 | 7/1993 |

OTHER PUBLICATIONS

Multi-Barrier, Model AR-10x96 Specification, Jan. 2003.
(Continued)

*Primary Examiner* — Raymond W Addie
(74) *Attorney, Agent, or Firm* — Workman Nydegger

(57) ABSTRACT

A barrier assembly includes a barrier having a chamber adapted to hold a ballast, an inlet being formed on the barrier in communication with the chamber. A flag assembly includes a post having a first end and an opposing second end with a flag disposed on the first end. A retainer is disposed on the post and includes a catch radially outwardly projecting from the post, the catch being movable between an outwardly extended position and an inwardly retracted position, the catch resiliently urging toward the extended position when in the retracted position, the first end of the post being received within the inlet on the barrier so that the catch is disposed within the chamber in the extended position, the catch being configured so that the first end of the post cannot be pulled out through the inlet without moving the catch to the retracted position.

14 Claims, 14 Drawing Sheets

(56) References Cited

U.S. PATENT DOCUMENTS

| | | | |
|---|---|---|---|
| 4,869,018 | A | 9/1989 | Scales et al. |
| 5,011,325 | A | 4/1991 | Antoniol |
| 5,022,781 | A | 6/1991 | Smith |
| 5,080,523 | A | 1/1992 | Steiner |
| 5,123,773 | A | 6/1992 | Yodock |
| 5,259,154 | A | 11/1993 | Lilley |
| 5,387,049 | A | 2/1995 | Duckett |
| 5,498,101 | A | 3/1996 | Braverman |
| 5,605,413 | A | 2/1997 | Brown |
| 5,611,641 | A | 3/1997 | Christensen |
| 5,639,179 | A | 6/1997 | Jensen |
| D400,264 | S | 10/1998 | Striefel et al. |
| 5,836,714 | A | 11/1998 | Christensen |
| 5,901,526 | A | 5/1999 | Vidmar et al. |
| 5,988,934 | A | 11/1999 | Wasserstrom |
| 6,059,487 | A | 5/2000 | Haga et al. |
| 6,086,285 | A | 7/2000 | Christensen |
| 6,189,868 | B1 | 2/2001 | Santelli, Jr. |
| 6,202,367 | B1 | 3/2001 | Marino et al. |
| D462,126 | S | 8/2002 | Englund |
| 6,666,616 | B2 | 12/2003 | Yodock et al. |
| 6,837,647 | B2 | 1/2005 | Tagg |
| 6,951,434 | B2 | 10/2005 | Yodock et al. |
| D519,646 | S | 4/2006 | Wilmotte |
| D533,281 | S | 12/2006 | Christensen et al. |
| D546,969 | S | 7/2007 | Christensen |
| 7,275,888 | B1 | 10/2007 | Christensen et al. |
| D555,804 | S | 11/2007 | Christensen |
| 7,303,358 | B1 | 12/2007 | Fuller |
| 7,588,387 | B1 | 9/2009 | Christensen et al. |
| 7,922,420 | B2 | 4/2011 | Christensen et al. |
| 2002/0025221 | A1 | 2/2002 | Johnson |
| 2003/0219308 | A1 | 11/2003 | Boulais et al. |
| 2004/0057790 | A1 | 3/2004 | Tagg |
| 2004/0146345 | A1 | 7/2004 | Consolazio et al. |
| 2005/0201828 | A1 | 9/2005 | Kang |
| 2006/0013650 | A1 | 1/2006 | Meidan |
| 2007/0098490 | A1 | 5/2007 | Christensen |
| 2009/0003931 | A1 | 1/2009 | Christensen et al. |
| 2010/0196094 | A1 | 8/2010 | Kulp et al. |

OTHER PUBLICATIONS

Flyer by Armorcast entitled Guardian Low Profile Barricade Portable Protection and Security to Keep your World in Control, published as least as early as Aug. 16, 2007.

Fact sheet for Neubert Aero Corp., Airport Low-Profile Barricade, published Dec. 21, 2005.

Office Action issued Jul. 12, 2011 in U.S. Appl. No. 12/646,572, filed Dec. 23, 2009.

Notice of Allowanced issued Jan. 26, 2012 in U.S. Appl. No. 12/646,572, filed Dec. 23, 2009.

Office Action issued Jan. 7, 2007 in U.S. Appl. No. 11/263,198, filed Oct. 31, 2005.

Office Action issued Jul. 16, 2007 in U.S. Appl. No. 11/263,198, filed Oct. 31, 2005.

Office Action issued Sep. 28, 2007 in U.S. Appl. No. 11/263,198, filed Oct. 31, 2005.

Final Office Action issued May 14, 2008 in U.S. Appl. No. 11/263,198, filed Oct. 31, 2005.

Notice of allowance issued Jan. 9, 2007 in U.S. Appl. No. 29/241,112, filed Oct. 24, 2005.

Notice of allowance issued Jan. 11, 2007 in U.S. Appl. No. 29/277,119, filed Feb. 14, 2007.

Notice of Allowance issued Jan. 26, 2012 in U.S. Appl. No. 12/646,572, filed Dec. 23, 2009.

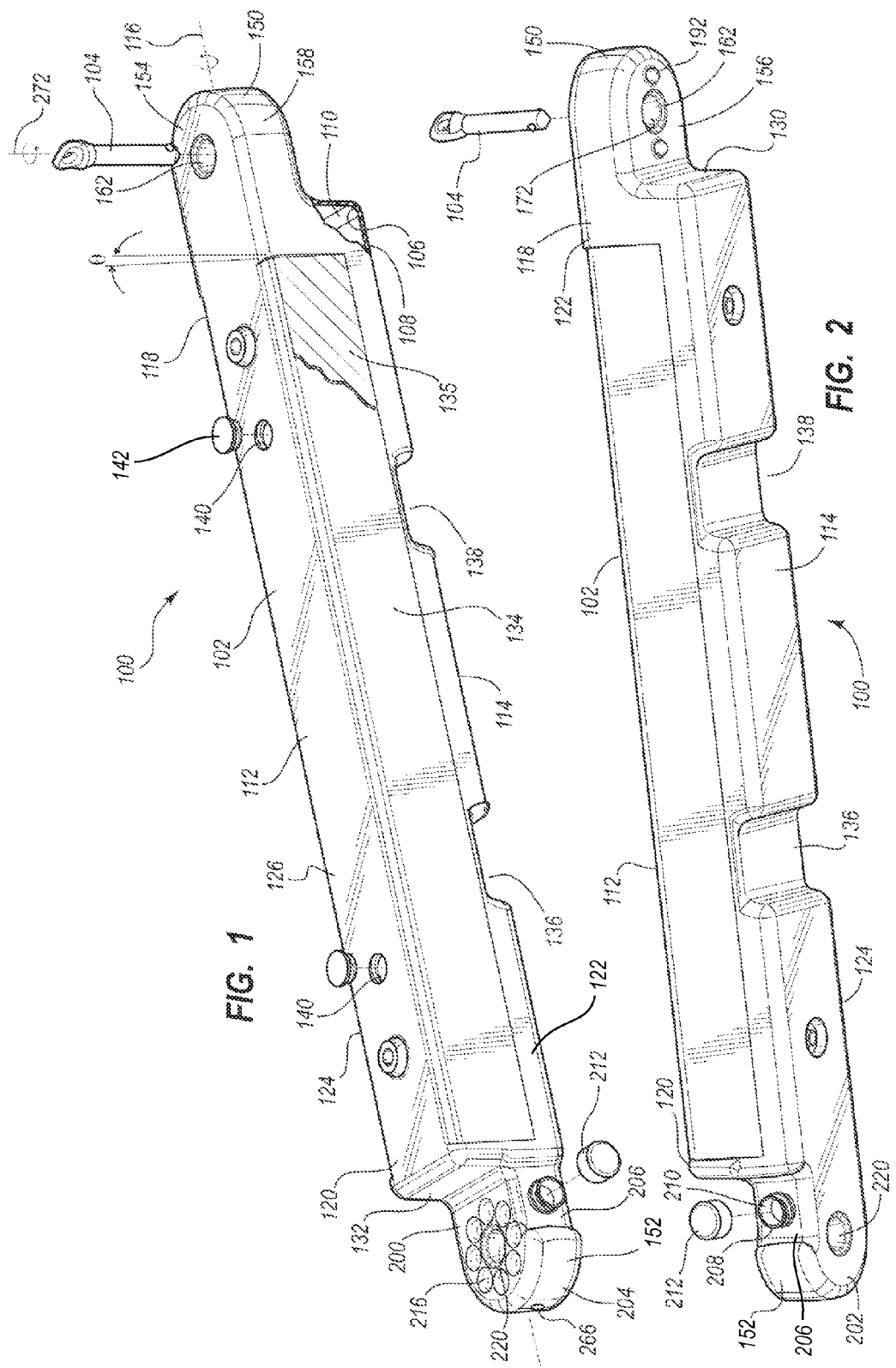

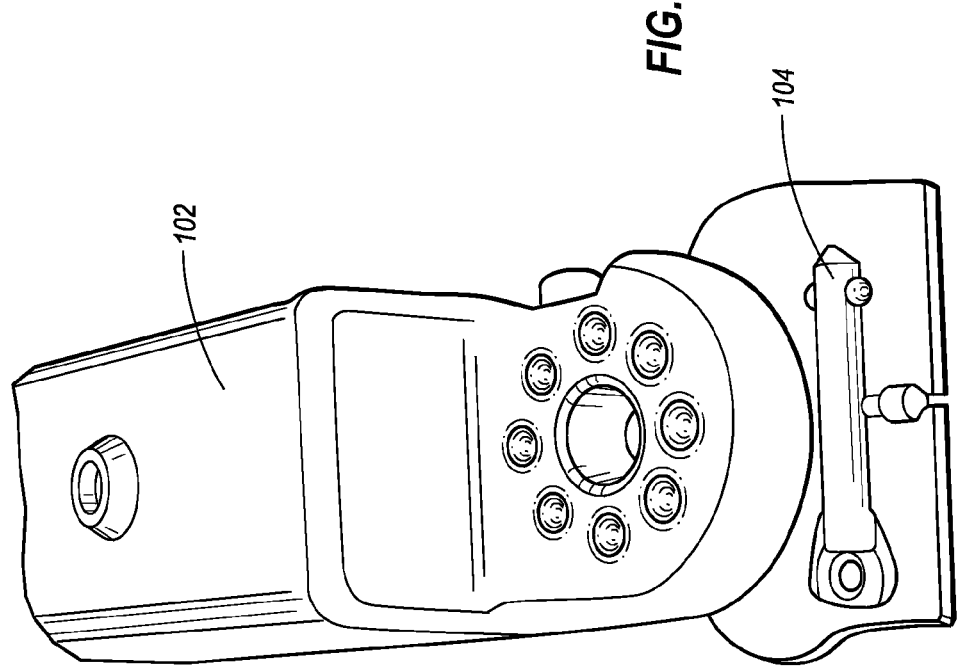

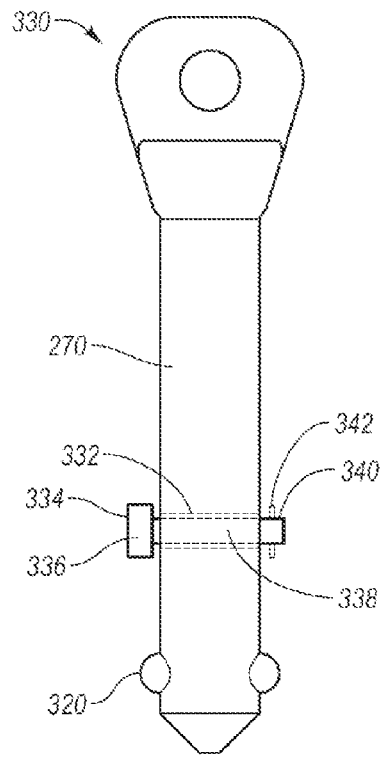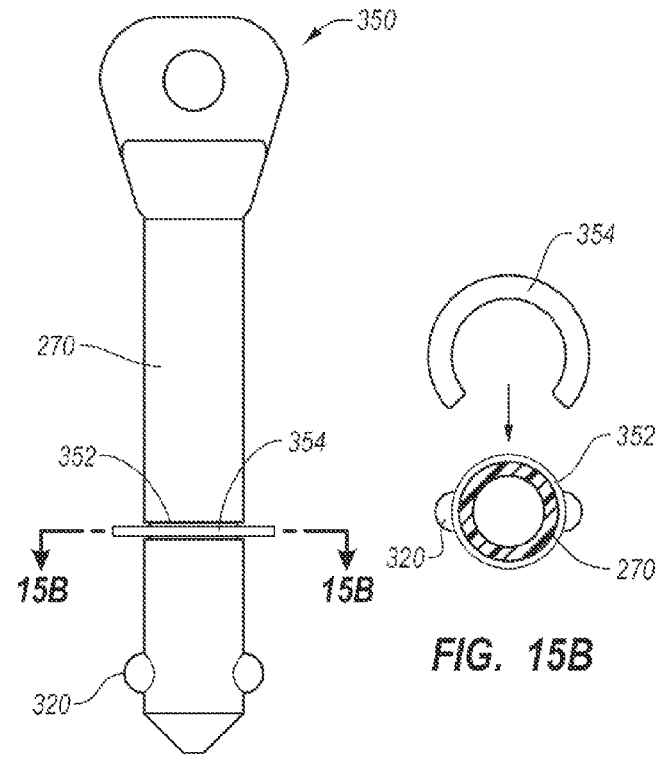
FIG. 14  FIG. 15A  FIG. 15B
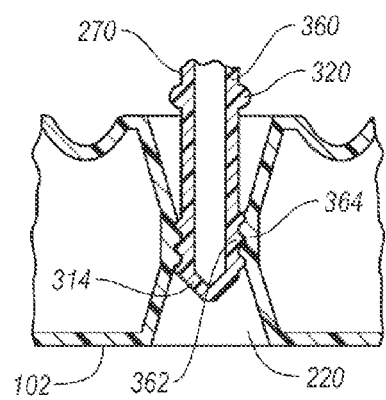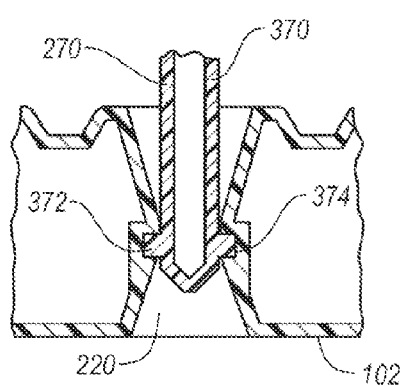
FIG. 16  FIG. 17

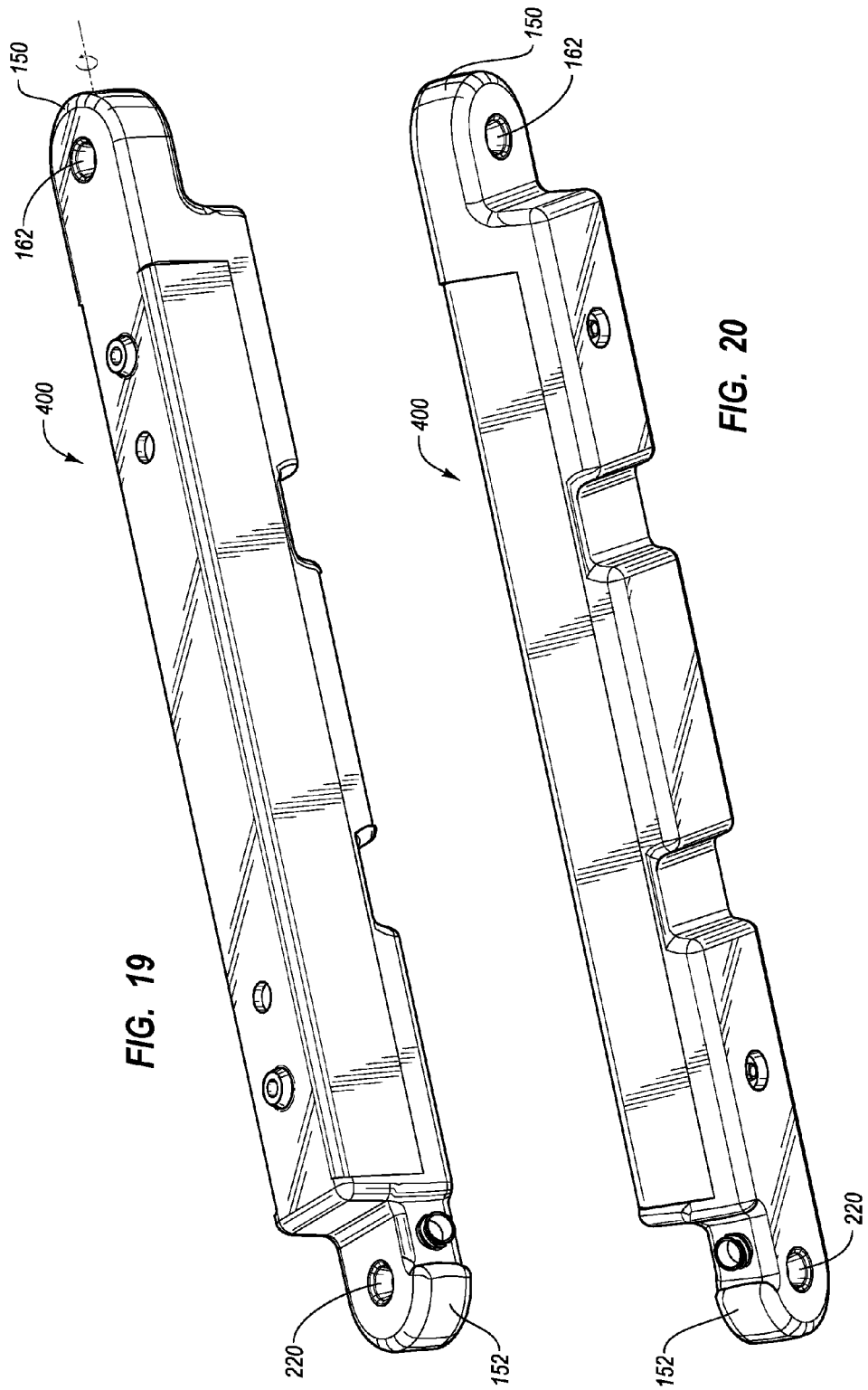

BARRIER SYSTEMS WITH INTERLOCKING FLAG

CROSS-REFERENCE TO RELATED APPLICATIONS

This application is a divisional of U.S. application Ser. No. 13/436,014, filed Mar. 30, 2012, which is a continuation-in-part of U.S. application Ser. No. 12/646,572, filed Dec. 23, 2009, now U.S. Pat. No. 8,167,512, which are incorporated herein by specific reference.

BACKGROUND OF THE INVENTION

1. The Field of the Invention

The present invention relates to barrier systems, and more particularly, barrier systems having a removable interlocking flag.

2. The Relevant Technology

Control barriers are used in a variety of situations. For example, control barriers can be selectively positioned at special events or construction sites to help direct pedestrian and automobile traffic in a desired direction. Similarly, control barriers can be used at airports to delineate construction zones and direct ground traffic and taxiing aircraft in a desired direction. Alternatively, control barriers can be put up to help limit access to select areas. In yet other embodiments, control barriers can be put up to define an entertainment stage or the boundaries of a playing field. For example, control barriers can be used to define the boundaries of a soccer field or an ice skating rink. Control barriers are also being used on runways and taxiways of airports to help guide airplane traffic.

Conventional control barriers have long comprised individual sawhorse type barriers or collapsible V-shape barricades. Such barriers, however, have limited use since they are generally lightweight and are thus easily tipped over or moved. This can be especially problematic when used at airports in conjunction with aircraft where the barriers cannot withstand the propeller wash or jet blast produced by aircraft and will be blown over or blown out of position. Similar problems also occur when such conventional barriers are used in other high impact environments. Other airport problems can arise due to the height of the barriers, which can cause damage to engines, wings, or other portions of aircraft that do not clear the height of the barrier. In addition, the lightweight barrier or any portion thereof can potentially be sucked in to the engine of the aircraft, thereby potentially causing a great deal of damage that is typically extremely expensive to repair and potentially dangerous to the passengers on the aircraft.

Furthermore, conventional barriers are typically not connected together and often have spaces or gaps extending therebetween. As such, it is possible for individuals or ground equipment to either slip between or through the barriers.

Other barriers comprise various gates or walls that are mechanically assembled. Such barriers, however, require extensive time to assemble and disassemble. In yet other alternative embodiments, concrete barriers have been used. Although concrete barriers are not easily tipped over and can withstand impact, such as the propeller wash or jet blast of aircraft, such barriers are extremely heavy. As such, they are difficult to move and place in desired locations. Often, special equipment such as forklifts or cranes are required. Furthermore, concrete barriers can be both difficult and expensive to move over large distances and require a large area to store. Concrete barriers can also be dangerous in that they are rigid and non-forgiving when impacted by a person, car, or taxiing aircraft.

In one attempt to overcome some of the above problems, plastic barriers have been made. The plastic barriers are hollow and can be filled with water for stabilizing. Although an improvement, existing plastic barriers also have several limitations. For example, plastic barriers are typically large and bulky. As a result, they are not easily stacked and require large areas to store and transport. Furthermore, conventional plastic barriers are typically too large to meet the strict requirements of being placed on the taxiway or runway of an airport. In addition, when used on taxiways or runways, portions of the barriers can break away or detach, which can also lead to potential damage to the engines, as discussed above.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

FIG. 1 is a top perspective view of one embodiment of a barrier assembly according to the present invention;

FIG. 2 is a bottom perspective view of the barrier assembly shown in FIG. 1;

FIG. 13 is a perspective view of the formed barrier and coupler shown in FIG. 1, after being removed from the mold;

FIG. 14 is a front view of an alternative embodiment of a coupler according to the present invention;

FIGS. 15A and 15B are front and cross-sectional top views, respectively, of another alternative embodiment of a coupler according to the present invention;

FIG. 16 is a cross sectional front view of a portion of an alternative embodiment of a coupler attached to a barrier;

FIG. 17 is a cross sectional front view of a portion of another alternative embodiment of a coupler attached to a barrier;

FIG. 19 is a top perspective view of another alternative embodiment of a barrier according to the present invention;

FIG. 20 is a bottom perspective view of the barrier shown in FIG. 19;

DETAILED DESCRIPTION OF THE PREFERRED EMBODIMENTS

Figure 3:
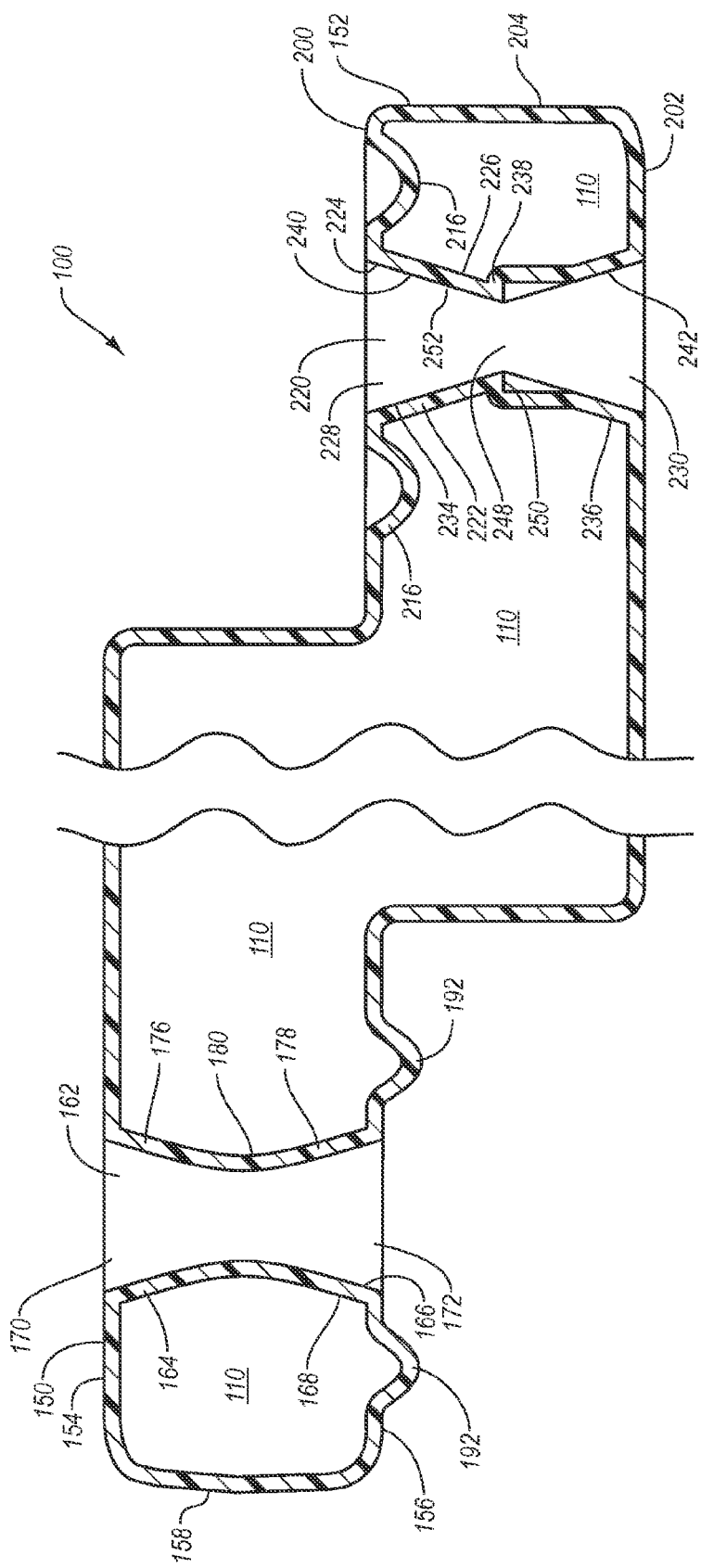
FIG. 3 is a cross-sectional side view of the projection portions at each end of the barrier shown in FIG. 1.

As used in the specification and appended claims, directional terms, such as "up," "down," "left," "right," "upward," and "downward" are used herein solely to indicate relative directions in viewing the drawings and are not intended to limit the scope of the claims in any way.

Depicted in FIGS. 1 and 2 is one embodiment of an inventive barrier assembly 100 incorporating features of the present invention. As shown in FIG. 1, barrier assembly 100 comprises a barrier 102 and a separate, discrete coupler 104 secured thereto.

Barrier 102 has an interior surface 106 and an opposing exterior surface 108, the interior surface 108 bounding a chamber 110 that is adapted to receive a ballast. As used in the specification and appended claims, the term "ballast" is broadly intended to include any materials which can be poured into internal chamber 110. By way of example and not by limitation, the ballast can include water, salt water, non-freezing fluids, sand, rock, cement, concrete, and the like.

Barrier 102 comprises a central body portion 112 having a floor 114 and a longitudinal axis 116 extending between a first end 118 and an opposing second end 120. Central body portion 112 further comprises opposing side walls 122 and 124 extending between floor 114 and a top wall 126. Floor 114, side walls 122 and 124, and top wall 126 each extend from a first end face 130 disposed at the first end 118 of barrier 102 to a second end face 132 disposed at the second end 120 of barrier 102. First end face 130 and second end face 132 can be substantially flat, curved, or have other configurations. In the depicted embodiment, first end face 130 and second end face 132 are each substantially planar so as to form a flat surface between opposing sided walls 122 and 124.

Top wall 126 can be flat, as depicted in FIG. 1, or can be rounded, or have other shapes. Side walls 122 and 124 are depicted as sloping downward and away from top wall 126. That is, side walls 122 and 124 are relatively closer to each other where side walls 122 and 124 adjoin top wall 126 than where side walls 122 and 124 adjoin floor 114. In other embodiments, side walls 122 and 124 are relatively parallel to each other and in still other embodiments, side walls 122 and 124 can be relatively closer to each other where side walls 122 and 124 adjoin floor 114 than where side walls 122 and 124 adjoin top wall 126.

In one embodiment, a display portion 134 can be formed into one or both side walls 122 and 124 so that displays or other structures can be mounted on side walls 122 and/or 124. For example, as shown in FIG. 1, display portion 134 is recessed within side wall 122 and is substantially rectangular. In other embodiments, other shapes can be used. In the embodiment depicted, display portion 134 is sized so that reflective tape 135, such as a high intensity reflective sheeting, can be attached thereto. Alternatively, a reflective coating can be painted on or otherwise attached to display portion 134.

Display portion 134 can be sloped relative to the vertical to, e.g., reflect light upward toward a car driver or a pilot who may be many feet above the ground in an aircraft cockpit. The amount of slope of display portion 134 may or may not coincide with the slope of side wall 122. That is the slope of display portion 134 relative to vertical may be the same as side wall 122 or may be different. In the embodiment depicted, display portion 134 angles inward from side wall 122 toward opposite side wall 124 as display portion 134 rises toward top wall 126. The slope is such that the distance between display portion 134 and opposite side wall 124 is greatest near floor 114 than near the top of display portion 134. For example, in the embodiment depicted, display portion 134 forms an angle θ of about three degrees relative to vertical. In alternative embodiments, angle θ can be in a range between about 2 degrees to about 15 degrees with about 2 degrees to about 10 degrees or about 2 degrees to about 5 degrees being more preferred. Other angles can also be used. It is appreciated that side wall 124 can include a display portion 134 in like manner to side wall 122. Thus, in other embodiments display portions 134 can be disposed in parallel planes, can each slope in intersecting planes, or one wall can be vertical while the other wall slopes relative thereto.

As shown in FIG. 2, a pair of spaced apart fork lift channels 136 and 138 are recessed on floor 114 and extends from side wall 122 to side wall 124. Fork lift channels 136 and 138 are configured to receive the tines of a fork lift such that, if desired, barrier 102 can be moved by a fork lift even if filled with ballast. If desired, pads comprised of rubber, old car tires, or other material having a higher coefficient of friction than barrier 102, can be secured to floor 114 to increase the coefficient of friction of barrier 102.

Returning to FIG. 1, one or more inlet ports 140 are formed on top wall 126. Each inlet port 140 extends through barrier 102 so as to communicate with chamber 110. Accordingly, barrier 102 can be filled with ballast by passing the ballast through inlet port 140 and into chamber 110. Each inlet port 140 can be selectively closed or sealed by a cap 142. Inlet ports 140 can each comprise a thread molded into top wall 126 to allow the cap to be screwed onto barrier 102. Alternatively, a threaded insert can be molded, welded, or otherwise attached to top wall 126 to form inlet port 140. Instead of a cap, either of inlet ports 140 can be selectively closed by a light assembly so as to eliminate the need for cap 142. Various examples of inlet ports, caps, and light assemblies that can be used are disclosed in U.S. patent application Ser. No. 11/828,925, filed on Jul. 26, 2007, which application is incorporated herein by specific reference. It is appreciated that inlet port 140 can be positioned at other locations on barrier 102. For example, inlet port 140 can be formed directly on barrier 102 anywhere on top wall 126, or on an upper portion of either of side walls 122 or 124.

As shown in FIGS. 1 and 2, barrier 102 further includes a first projection portion 150 and a second projection portion 152 respectively projecting longitudinally outward from first end face 130 and second end face 132 of central body portion 112. Projection portions 150 and 152 are configured such that for identical barriers 102, the first projection portion 150 of one barrier can overlap the second projection portion 152 of the other barrier while the floor 114 of both barriers are resting on a common support surface, as discussed in further detail below.

First projection portion 150 comprises a top surface 154 and an opposing bottom surface 156 with a perimeter sidewall 158 extending therebetween. In the depicted embodiment top surface 156 of first projection portion 200 lies in the same plane as top wall 126 of central body portion 112 so as to be horizontally displaced when barrier 102 is positioned on a level surface. Alternatively, top surface 156 can lie in a different plane than top wall 126. Bottom surface 156 projects longitudinally outward from first end face 130 on first end 118 and is substantially parallel to top surface 154 and thus also horizontally displaced when barrier 102 is positioned on a level surface. Other orientations can alternatively be used.

Perimeter sidewall 158 is substantially vertical as it extends between top surface 154 and bottom surface 156, although this is not required. First projection portion 150 is rounded on a distal end such that the end of first projection portion 150 is substantially semi-circular when viewed from a position perpendicular to bottom surface 156 of first projection 150. In the depicted embodiment one end of sidewall 158 attaches to central body portion 112 and lies in the same plane as side wall 122 and the other end of sidewall 158 attaches to central body portion 112 and lies in the same plane as side wall 124.

Extending completely through first projection portion 150 between top surface 154 and bottom surface 156 is a passage 162. Passage 162 is generally centrally located on first projection portion 150. Turning to FIG. 3, passage 162 is formed by an internal sidewall 164 having an outside face 166 and an opposing inside face 168. The outside and inside faces 166 and 168 extend from a top mouth 170 at top surface 154 of first projection portion 150 to a bottom mouth 172 at bottom surface 156 of first projection portion 150. Outside face 166 bounds the passage 162, while inside face 168 communicates with chamber 110. Chamber 110 can encircle passage 162. Passage 162 is generally circular when viewed from above. That is, passage 162 has a generally circular cross sectional shape at any point between the top and bottom mouths 170 and 172. Other shapes can alternatively be formed.

As shown in the depicted embodiment, passage 162 is formed in first projection portion 150 so as to include a constricting portion 180 between top and bottom mouths 170 and 172. Constricting portion 180 generally corresponds to the narrowest portion of passage 162. In the depicted embodiment, passage 162 is shaped in the form of an hourglass, with an upper portion 176 and a lower portion 178 respectively disposed above and below constricting portion 180. During use, constricting portion 180 prevents a portion of elongated coupler 104 (FIG. 1) from passing all the way through passage 162, while allowing another portion of coupler 104 to extend down through passage 162 and project below bottom surface 156 of first projection portion 150, as described in more detail below.

Constricting portion 180 can be integrally formed with sidewall 164, as in the depicted embodiment, or can comprise a constriction insert that is attached to or embedded within sidewall 164. Furthermore, although constricting portion 180 is depicted as being generally centrally located between top and bottom mouths 170 and 172 of passage 162, it is appreciated that constricting portion 180 alternatively can be positioned anywhere along passage 162. That is, constricting portion 180 can be positioned adjacent mouth 170 or mouth 172, or anywhere in between. In addition, constricting portion 180 can completely encircle passage 162, or can only be positioned on one side of the passage. Other configurations are also possible.

Returning to FIG. 2, a pair of engagers 192 project downward from bottom surface 156 of first projection portion 150. Engagers 192 are formed on bottom surface 156 or can be molded or attached thereto. Each engager 192 is substantially similar in size and shape. The engagers 192 can be substantially rounded, such as substantially semi-spherical as in the depicted embodiment, or can be rectangular or form some other shape. The engagers 192 are positioned on bottom surface 156 so as to be diametrically opposed to each other, with the bottom mouth 172 of passage 162 being positioned substantially half way between the engagers 192.

As shown in FIGS. 1 and 2, second projection portion 152 comprises a top surface 200 and an opposing bottom surface 202 with a perimeter sidewall 204 extending therebetween. In the depicted embodiment bottom surface 202 of second projection 152 lies in the same plane as floor 114 of central body portion 112 so as to be horizontally displaced when barrier 102 is positioned on a level surface. Alternatively, bottom surface 202 can lie in a different plane than floor 114. Top surface 200 projects longitudinally outward from second end face 132 on second end 120 and is substantially parallel to bottom surface 202 and thus also horizontally disposed in the embodiment depicted when barrier 102 is positioned on a level surface.

Perimeter sidewall 204 is substantially vertical as it extends between top surface 200 and bottom surface 202, although this is not required. Second projection portion 152 is rounded on a distal end such that the end of second projection portion 152 is substantially semi-circular when viewed from a position perpendicular to top surface 200 of second projection portion 152. In one embodiment one end of sidewall 204 attaches to central body portion 112 and lies in the same vertical plane as side wall 122 and the other end attaches to central body portion 112 and lies in the same vertical plane as side wall 124.

As shown in the depicted embodiment, side wall 204 has a recessed portion 206 disposed therein. Outwardly projecting from side wall 204 within recessed portion 206 is a tubular stem 208. Stem 208 bounds an outlet port 210 that extends through barrier 102 so as to communicate with chamber 110. By virtue of its position near floor 114, outlet port 210 can be used to selectively drain ballast from barrier 102.

A cap or plug 212 can be screwed into or onto or otherwise attached to stem 208 so as to seal outlet port 210 closed. In alternative embodiments, outlet port 210 can be positioned at other locations on barrier 102. For example, outlet port 210 can alternatively be positioned on side wall 122 or 124 of central body portion 112 near floor 114. Likewise, as with inlet port 140, outlet port 210 can be formed without stem 208. It is noted that by positioning outlet port 210 in a recessed portion 206, a partially protected space is provided for stem 208 and related cap or plug 212.

Extending completely through second projection portion 152 between top surface 200 and bottom surface 202 is a passage 220. Passage 220 is generally centrally located on second projection portion 152. Passage 220 is configured to generally align with passage 162 formed in first projection portion 150 of a separate identical barrier when first projection portion 150 is positioned so as to overlap second projection portion 152, as discussed below.

Returning to FIG. 3, passage 220 is formed by an internal sidewall 222 having an outside face 224 and an opposing inside face 226. The outside and inside faces 224 and 226 extend from a top mouth 228 at top surface 200 of second projection portion 152 to a bottom mouth 230 at bottom surface 202 of second projection portion 152. Outside face 224 bounds the passage 220, while inside face 226 communicates with chamber 110. Similar to passage 162 in first projection portion 150, chamber 110 can encircle passage 220.

Also similar to passage 162, passage 220 is formed so as to include a constricting portion 238 between top and bottom mouths 228 and 230. Similar to constriction portion 180 with respect to passage 162, constricting portion 238 generally corresponds to the narrowest portion of passage 220 with an upper portion 234 and a lower portion 236 of passage 220 respectively disposed above and below constricting portion 238. In the depicted embodiment, unlike passage 162 of first projection portion 150, passage 220 does not have a generally circular cross sectional shape and is not symmetrical.

Upper portion 234 of passage 220 is bounded by an outside face 240 that comprises the portion of outside face 224 positioned above constricting portion 238. Lower portion 236 of passage 220 is bounded by an outside face 242 that comprises the portion of outside face 224 positioned below constricting portion 238.

As shown in the depicted embodiment, a portion of upper portion 234 and a portion of lower portion 236 are connected together such as by being integrally molded together at constricting portion 238. Constricting portion 238 can be encircled by chamber 110. A hole 248 is formed through constricting portion 238, thereby allowing the passage 220 to extend from mouth 228 at top surface 200 to mouth 230 at bottom surface 202. As discussed below, a portion of elongated coupler 104 (FIG. 1) can be extended down through passage 220 and project below constricting portion 238 of second projection portion 152.

Figure 4:
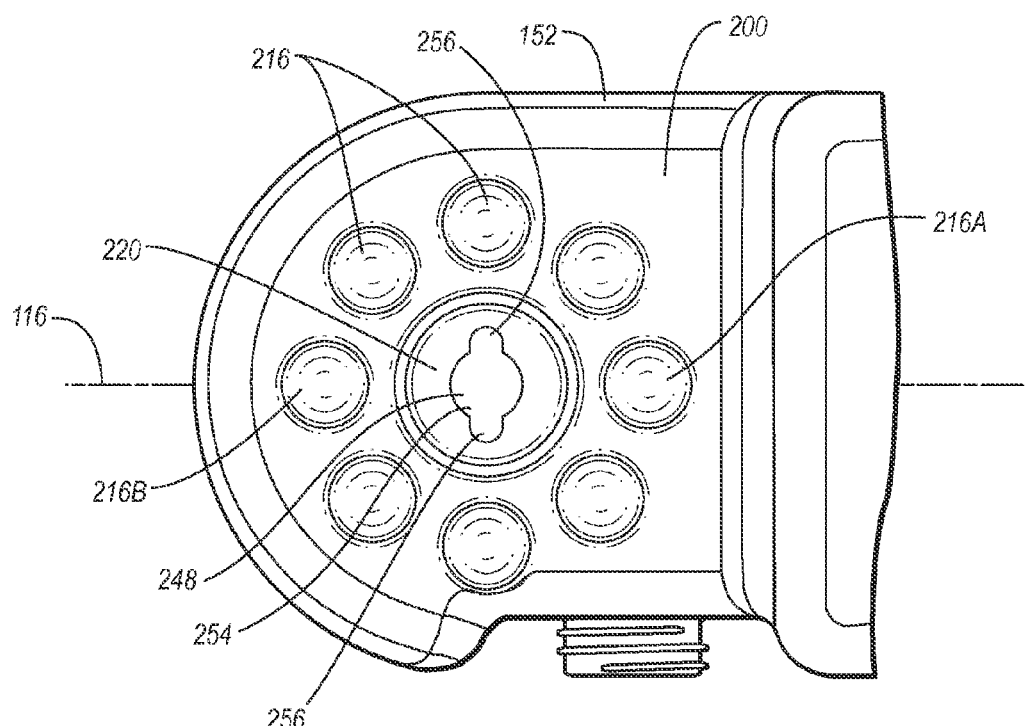
FIGS. 4 and 5 are top and bottom views, respectively, of one of the projection portions of the barrier shown in FIG. 1.
Figure 5:
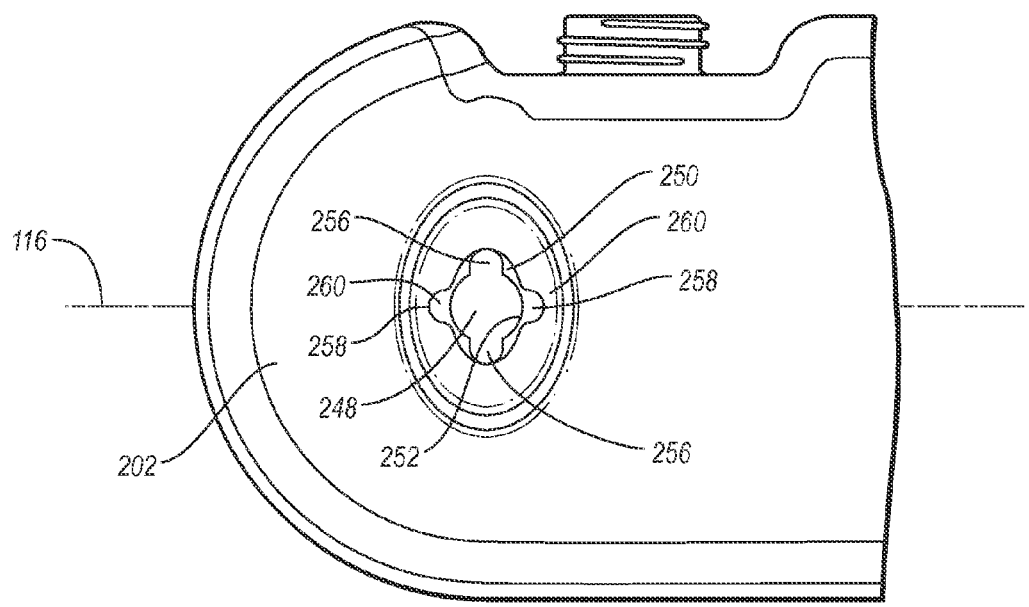

As shown in FIG. 3, upper portion 234 of passage 220 overhangs lower portion 236 so as to form a ledge 250 at constricting portion 238. Ledge 250 faces downward towards the bottom surface 202 of second projection portion 152 and extends between hole 248 and outside face 242. Ledge 250 has an inner edge 252 which bounds hole 248. Turning to FIGS. 4 and 5, ledge 250 encircles hole 248 and has an irregular shape. As best shown in FIG. 5, inner edge 252 of ledge 250 is shaped such that hole 248 that is formed thereby has a substantially round central section 254. Hole 248 also has a pair of smaller semicircular ear-like sections 256 extending away from central section 254 in diametrically opposing directions. In the depicted embodiment, extended sections 256 extend in opposite directions that are substantially orthogonal to the longitudinal axis 116, although this is not required.

As shown in FIG. 5, a pair of recesses 258 are formed in upper portion 236 of passage 220 that extend up to and are bounded by ledge 250. The recesses 258 are positioned so as to be diametrically opposed to each other about central section 254 of hole 248. Ledge 250 includes a pair of diametrically opposed portions 260 aligned with recesses 258 and offset around hole 248 by approximately 90 degrees from ear-like sections 256. Portions 260 of ledge 250 are shaped to be substantially the same size as central section 254 of hole 248.

Constricting portion 238 and the accompanying structure located thereat can be integrally formed with sidewall 164, as in the depicted embodiment, or can comprise an insert that is attached to or embedded within sidewall 222. Furthermore, although constricting portion 238 is depicted as being generally centrally located between top and bottom mouths 228 and 230 of passage 220, it is appreciated that constricting portion 238 alternatively can be positioned anywhere along passage 220. That is, constricting portion 238 can be positioned adjacent mouth 228 or adjacent mouth 230, or anywhere in between. Other configurations are also possible.

As shown in FIG. 3, first and second projection portions 150 and 152 are configured so that the bottom surface 156 of first projection portion 150 is disposed either in substantially the same plane as top surface 200 of second projection portion 152 or is disposed above top surface 200 of second projection portion 152. The term "above" is defined as being a further distance away from floor 114.

Figure 6:
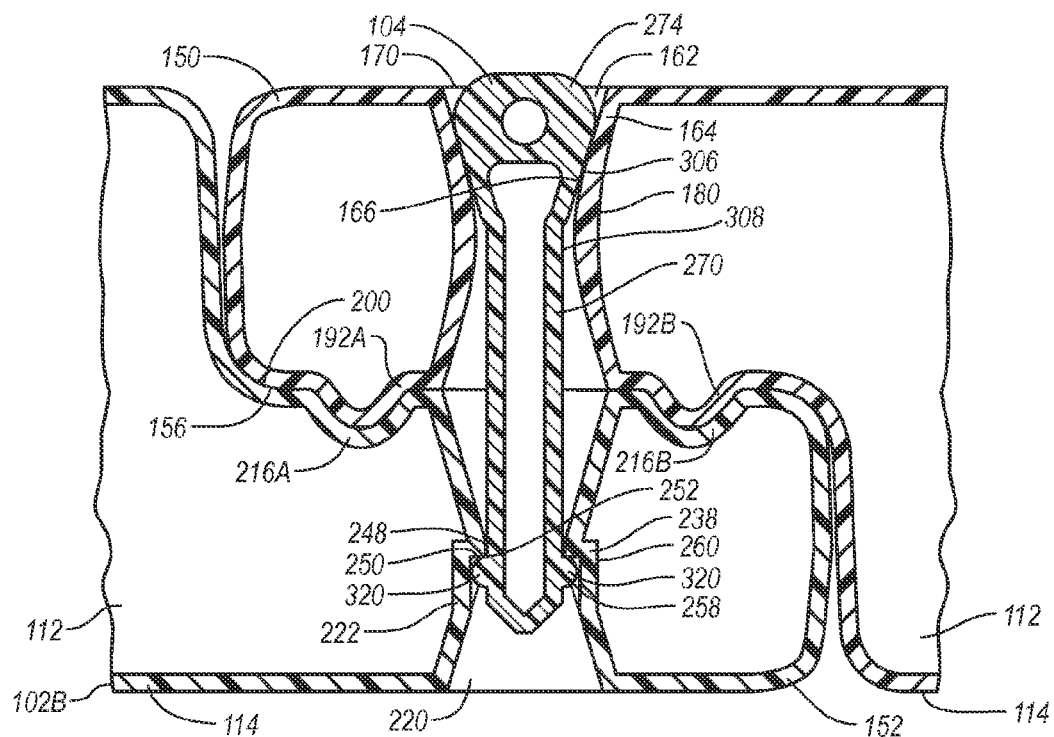
FIGS. 6 and 7 are cross-sectional side and end views, respectively, of the ends of a pair of barriers shown in FIG. 1 coupled together by the coupler shown in FIG. 1.
Figure 7:
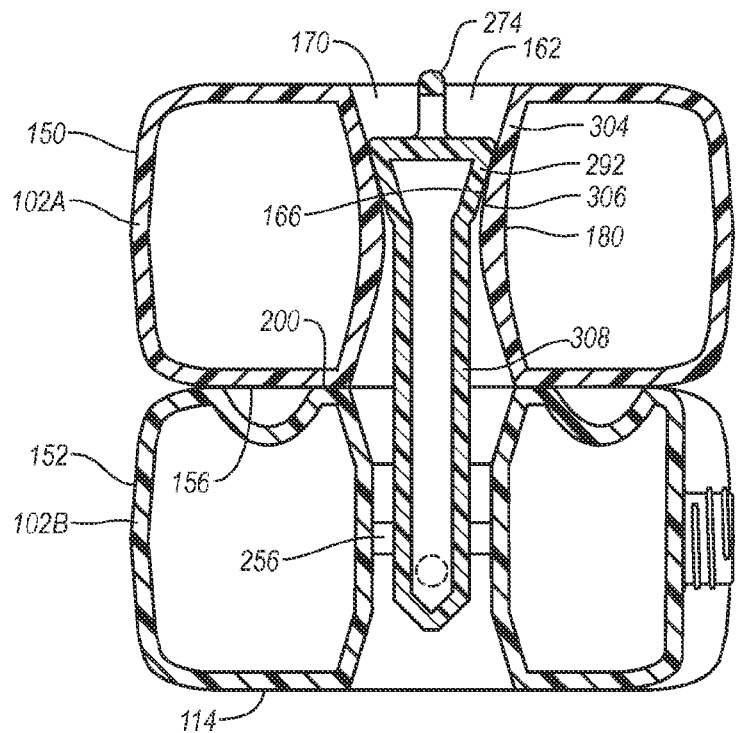

Turning to FIGS. 6 and 7, because bottom surface 156 of first projection portion 150 is either in the same plane as or above top surface 200 of second projection portion 152, the first projection portion 150 of one barrier 102A can overlap the second projection portion 152 of another identical barrier 102B while floor 114 of central body portion 112 of both barriers are resting on a common support surface. When the identical barriers 102A and 102B overlap as in FIGS. 6 and 7, passage 162 of first projection portion 150 of barrier 102A generally aligns with passage 220 of second projection portion 152 of barrier 102B.

Although passage 220 is shown as extending all the way through second projection portion 152, that is not required. For example, in some embodiments, bottom surface 202 extends over the entire second projection portion 152, covering bottom mouth 230 of passage 220. In those cases, passage 220 would need to extend into second projection portion 152 from top surface 200 past connecting joint 238 so that coupler 104 can be secured therein.

Returning to FIG. 1, one or more pockets 216 are also formed on the top surface 200 of second projection portion 152. The pockets 216 are configured to receive engagers 192 disposed on the first projection 150 of an identical barrier. As such, each pocket 216 is sized and shaped to snugly receive a separate engager 192. The embodiment depicted includes eight pockets 216. In other embodiments the number of pockets can be six or ten or any other number. As shown in FIG. 4, the plurality of pockets 216 are disposed in a substantially circular pattern around top mouth 228, the circular pattern having a diameter that is substantially equal to the distance between engagers 192 (FIG. 2). Each pocket 216 has a matching pocket 216 diametrically opposed to it on the opposite side of the circle (for example, pockets 216A and 216B). This allows each pair of pockets 216 to be able to receive the pair of engagers 192. For example, as shown in FIG. 6, the pair of engagers 192A and 192B of barrier 102A can respectively be received in the pair of pockets 216A and 216B of barrier 102B when first projection portion 150 of barrier 102A overlaps second projection portion 152 of barrier 102B.

Figure 8:
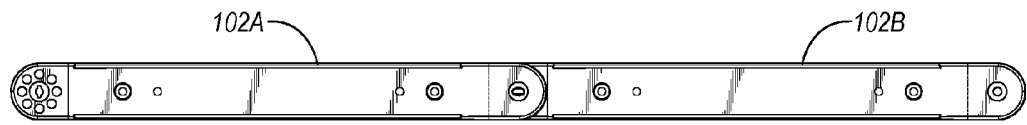
FIGS. 8-10 are top plan views of a pair of barriers shown in FIG. 1 coupled together at various angles of connection.
Figure 9:
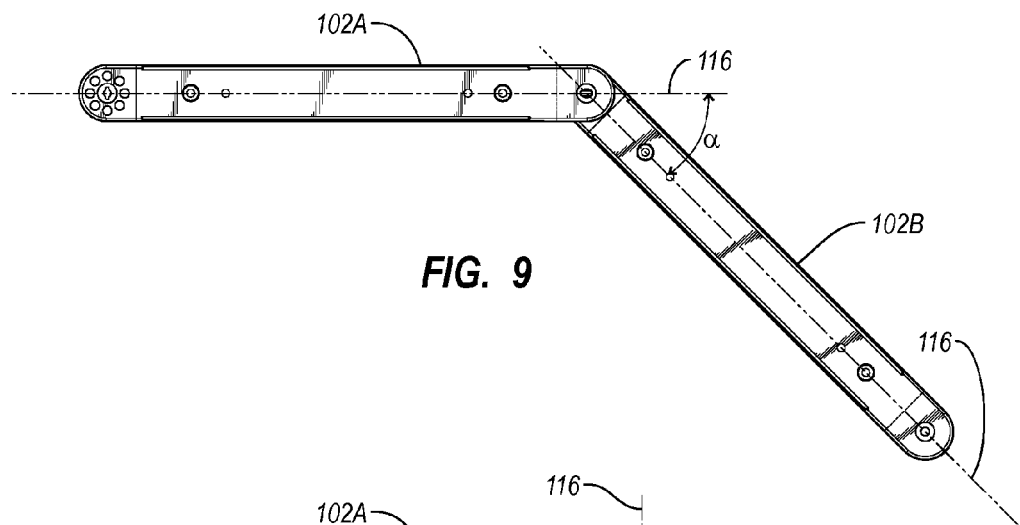
Figure 10:
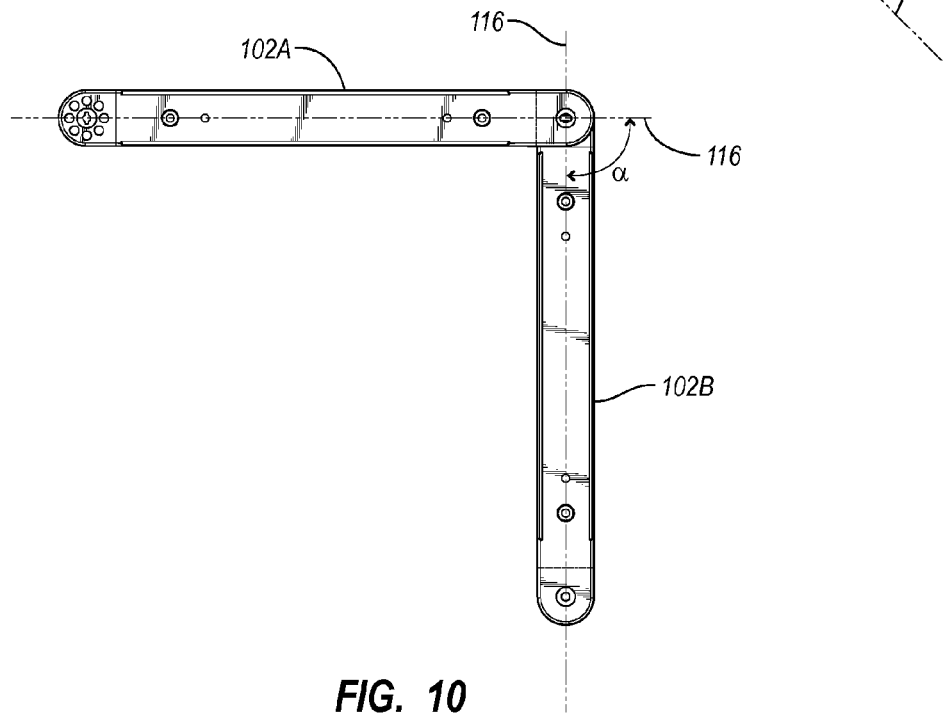

Returning to FIG. 4, there are four pairs of diametrically opposed pockets 216 formed in top surface 200 of second projection portion 152 in the embodiment depicted. This allows angles of multiples of 45 degrees to be able to be formed between the two engaged barriers 102A and 102B when engaged, as shown in FIGS. 8-10. To receive the pair of engagers 192 in a different pair of pockets 216, first projection portion 150 of first barrier 102A is lifted off second projection portion 152 of second barrier 102B until no engagers 192 are received in any pockets 216. First barrier 102A is then rotated with respect to second barrier 102B until the engagers 192 on first projection portion 150 of barrier 102A become vertically aligned with another pair of pockets 216 on second projection portion 152 of barrier 102B. First projection portion 150 of barrier 102A is then lowered onto second projection portion 152 of barrier 102B, causing the different pair of pockets 216 to receive the pair of engagers 192.

Figure 11:
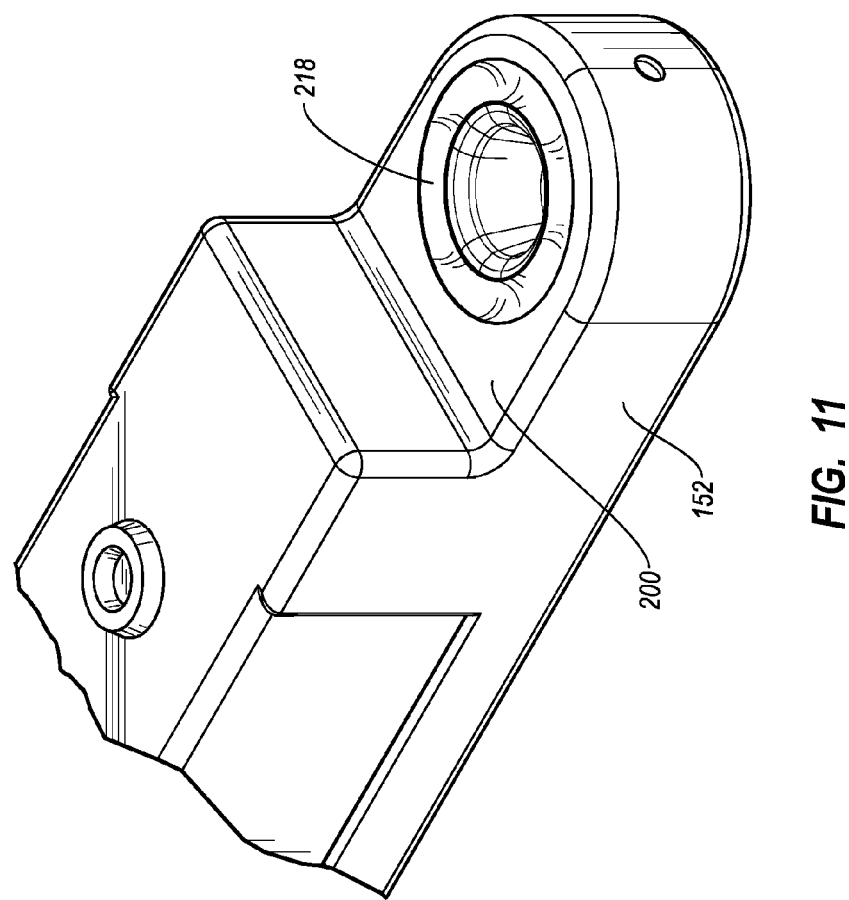
FIG. 11 is a perspective view of one end of the barrier shown in FIG. 1 showing an alternative engaging mechanism.

Turning to FIG. 11, a single annular channel 218 can be used instead of a plurality of individual pockets 216 to receive engagers 192. In this regard a single engager 192 can also be used. Annular channel 218 is formed in top surface 200 of second projection portion 152. Channel 218 forms a continuous ring recessed on top surface 200 and has a diameter substantially equal to the distance between engagers 192. The cross-sectional shape of channel 218 substantially mirrors the shape of engagers 192 so that channel 218 can receive the pair of engagers 192 or a single engager 192.

Because annular channel 218 is a continuous channel, engagers 192 can be received by channel 218 at any location around channel 218, thus allowing a continuum of angles to be formed between the engaged barriers. In the depicted embodiment, the range of angles that can be formed between two engaged barriers is about +90° to about −90°. Rotating barrier 102A with respect to barrier 102B is easier than when using individual pockets 216, depicted above. To receive the pair of engagers 192 in a different location within channel 218, first projection portion 150 of first barrier 102A is only slightly lifted, and then rotated with respect to second barrier 102B until the desired angle is obtained. First projection portion 150 of barrier 102A is then lowered onto second projection portion 152 of barrier 102B, causing the pair of engagers 192 to be received in a different location within channel 218.

In view of the foregoing, projection portions 150 and 152 and the engagers 192 and pockets 216 are formed so that a selective angle α can be formed between the longitudinal axis 116 of each of the coupled barriers 102. Some of these angles are shown in FIGS. 8-10. For example, in FIG. 9 angle α is shown at +45 degrees and can also extend to −45 degrees. In FIG. 10, the angle α is shown a +90 degrees and can also extend to −90 degrees. Here it is appreciated that by increasing the number of pockets 216, barriers 102 can be set at a larger number of predefined angles. Likewise, by using annular channel 218, barriers 102 can be set at any defined angle. In addition, by moving end faces 130 and 132 back, angle α can be made larger than 90 degrees. For examples, barriers 102 can be formed to extend over an angle of at least +120 degrees to −120 degrees.

Although engagers 192 have been disclosed as being disposed on bottom surface 156 of first projection portion 150 and pockets 216 have been disclosed as being disposed on top surface 200 of second projection portion 152, it is appreciated that in alternate embodiments, engagers 192 and pockets 216 can be disposed on the opposite surface. In other words, engagers 192 can alternatively be disposed on top surface 200 of second projection portion 152 and pockets 216 can alternatively be disposed on bottom surface 156 of first projection portion 150. Also, although the preceding discussion discloses a pair of engagers 192 being received by different pairs of pockets 216 within a plurality of pockets, it is appreciated that the present invention can also be accomplished by having only a single pair of pockets 216. The present invention can also be accomplished using only a single engager 192 that is received within a single pocket 216, including a single engager 192 received within one of a plurality of pockets 216 or by three or more engagers 192.

Barrier 102 is typically made of a resiliently deformable polymeric material having strong, semi-rigid, and energy absorbing properties. Such materials include linear or cross-linked plastics that will deform under pressure but will not fail in a brittle manner. Examples of conventional polymeric materials include polyethylene (including High Density Polyethelene (HDPE)), polyvinylchloride, nylon, polycarbonate, and polypropylene. Additives such as dyes, pigments, and reinforcements, such as fibers, can also be added to the material. Florescent dies can be added to help barriers 102 glow at night for better direction of traffic. In one embodiment, it is preferred that barrier 102 be made from a recyclable plastic such as polyethylene or HDPE. This enables old or broken barriers to be ground down and recycled into new barriers.

Barrier 102 is typically made by blow molding. Of course, other molding processes, such as rotational molding, injection molding or die molding, can also be used. In the depicted embodiment, an opening 266 is formed on the second projection portion 152, as shown in FIG. 1, to allow air to be blown into the barrier during the molding process to force the plastic material to fill the edges of the mold as the barrier is being formed. A fitting can be formed within sidewall 122 or 124 of second projection portion 152 to aid in this process. Opening 266 can be closed by a plug. Independent of the method used, it is generally desirable that the walls of barrier 102 have a substantially uniform thickness T, as shown in FIG. 3, so as to minimize shrink deformation. In one embodiment, barrier 102 has a thickness T in a range between about 0.2 cm to about 1.5 cm with about 0.3 cm to about 0.8 being more common. The thickness is chosen to optimize desired deflection and required strength properties. Other dimensions can also be used.

Figure 12A:
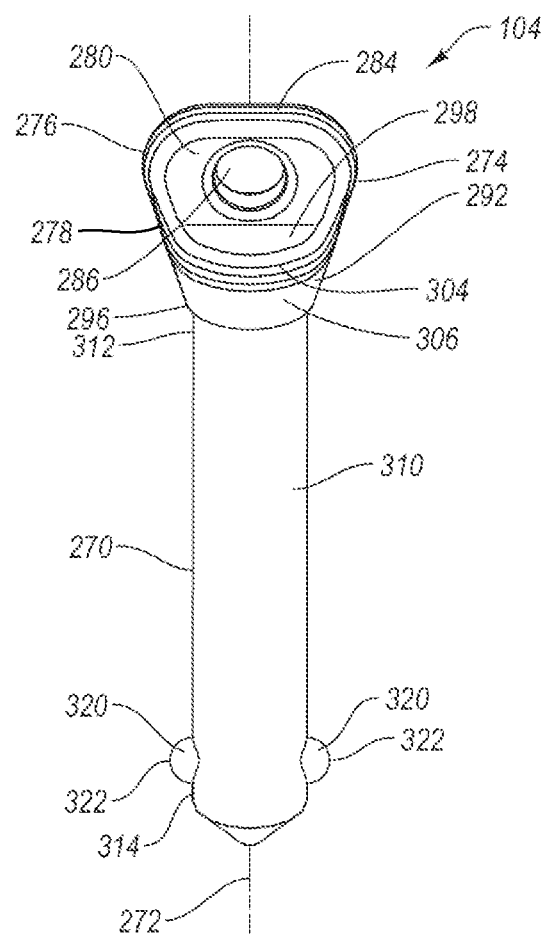
FIGS. 12A and 12B are side perspective and top plan views, respectively, of the coupler shown in FIG. 1.

As noted above and shown in FIGS. 1 and 2, barrier assembly 100 also comprises coupler 104. Turning to FIG. 12A, coupler 104 is in the form of a pin comprising an enlarged head 268 with an elongated shaft 270 extending therefrom along a longitudinal axis 272. Coupler 104 is configured to be inserted into passage 162 of first projection portion 150 and secured therein until used to secure the barrier to another barrier, as discussed below.

Figure 12B:
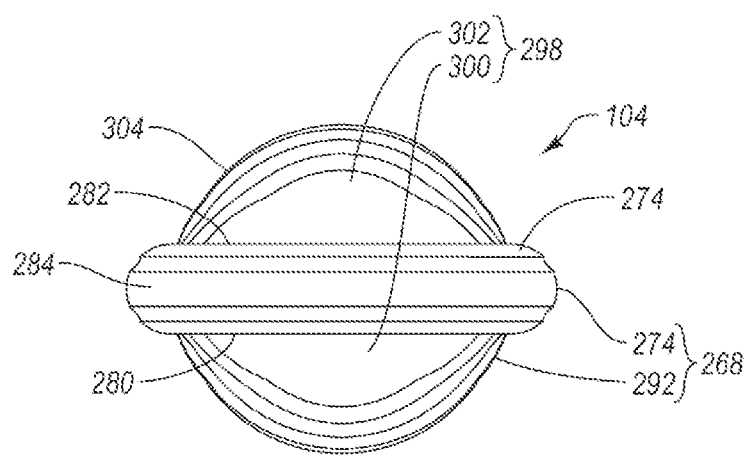

As shown in FIG. 12A, head 268 includes a gripping section 274 that extends longitudinally between a first end 276 and a spaced apart second end 278. Gripping section 274 is designed to be easily grasped and turned by a user so as to rotate coupler 104 about the longitudinal axis 272. Turning to FIG. 12B in conjunction with FIG. 12A, gripping section 274 is substantially plate-like, having a first side surface 280 and an opposing second side surface 282 that are substantially parallel to longitudinal axis 272 and to each other, with a perimeter side wall 284 extending therebetween. As shown in FIG. 12A, a hole 286 is formed in gripping section 274 that extends transversally completely therethrough between the first and second side surfaces 280 and 282, although this is not required As shown in FIGS. 12A and 12B, head 268 further comprises a securing section 292 extending longitudinally away from second end 278 of gripping section 274 to a spaced apart distal end 296. Securing section 292 has a top face 298 comprised of two sections 300 and 302 that respectively extend transversally out from the first and second side surfaces 280 and 282 at second end 278 of gripping section 274 to an outer edge 304. The two sections 300 and 302 of top face 298 are shaped so as to cause top face 298 to be substantially circular in shape. As shown in FIG. 12A, an encircling sidewall 306 extends from the outer edge 304 of top face 298 to distal end 296. Sidewall 306 is substantially frustoconically shaped so that its diameter gets progressively smaller as securing section 292 extends from top face 298 to distal end 296. The diameter of sidewall 306 at outer edge 304 is substantially greater than the diameter of passage 162 of first projection portion 150 at constricting portion 180 (FIG. 3). Because of this, securing section 292 cannot pass completely through passage 162, but instead sidewall 306 thereof butts up against outside face 166 of sidewall 164 above constricting portion 180 when coupler 104 is inserted through top mouth 170 and into passage 162 (see FIG. 7).

Shaft 270 extends longitudinally away from distal end 296 of securing section 292. Shaft 270 has an encircling sidewall 308 having an exterior surface 310 that extends from a first end 312 attached to sidewall 306, to an opposing second end 314 along central longitudinal axis 272. Shaft 270 is substantially cylindrical with a substantially constant diameter as it extends between first and second ends 312 and 314, with a tapering at second end 314, if desired. Other configurations can also be used. Shaft 270 is sized so as to be able to pass through passage 162 of first projection portion 150 and through passage 220 of second projection portion 152. As such, shaft 270 has a cross sectional diameter that is less than or equal to the diameter of passage 162 at constricting portion 180 and center section 254 of hole 248 of constricting portion 238, as shown in FIGS. 6 and 7.

As noted above, coupler 104 is designed to be retained within passage 162 after coupler 104 has been inserted therein. Thus, coupler 104 also includes means for securing coupler 104 within passage 162 of first projection portion 150. In the embodiment depicted in FIG. 12A, the means for securing comprises a pair of lobes 320, radially projecting out from sidewall 308 at or near second end 314. Lobes 320 are positioned on shaft 270 so as to be diametrically opposed to each other relative to central longitudinal axis 272. The distance between the outermost portions 322 of lobes 320 is slightly greater than the diameter of passage 162 at constricting portion 180 of first projection portion 150. As a result, coupler 104 can be retained within passage 162 after being inserted therein. Thus, lobes 320 can also be considered securing members of the coupler or pin 104.

Lobes 320 can be generally semicircular in shape, such as in the depicted embodiment, or some other shape. Lobes 320 can be integrally molded with sidewall 308, as in the depicted embodiment (see, e.g., FIG. 6) or can be attached or embedded within sidewall 308. Lobes 320 can be comprised of metal, hard plastic, or other rigid material. Although two lobes are depicted, one or three or more lobes can alternatively be used. When three or more lobes 320 are used, the mating structure of constricting portion 238 of passage 220 would be modified accordingly to receive the lobes.

In one embodiment, coupler 104 is inserted into passage 162 of barrier 102 while barrier 102 is still warm after being blow molded. The pliability of internal sidewall 164 while still warm allows lobes 320 to pass through passage 162. Barrier 102 is then allowed to cool and harden, whereupon the hardened internal sidewall 164 then prevents lobes 320 from passing back through passage 162. As such, coupler 104 is retained and secured within passage 162. Once secured within passage 162, coupler 104 is able to be freely rotated about longitudinal axis 272 by a user manipulating gripping section 274. In some embodiments, coupler 104 is also molded and inserted into passage 162 while coupler 104 is warm. In some embodiments, coupler 104 is molded inside the same mold as barrier 102 from the same piece of material, as shown in FIG. 13.

In light of the above, an exemplary method of manufacturing a barrier assembly according to the present invention can include: forming a barrier inside a mold using a polymeric material; removing the formed barrier from the mold while the barrier is still warm; and inserting an elongated pin into a passage formed between top and bottom surfaces of the formed barrier before the barrier has cooled, a securing member of the pin being passed through a restrictive portion of the passage as the pin is inserted, the restrictive portion of the passage allowing the securing member to pass therethrough while the formed barrier is still warm, but preventing the securing member from passing therethrough when the barrier has cooled, thereby securing the pin within the passage while still allowing the pin to freely rotate within the passage.

Coupler 104 is also used to secure one barrier to another barrier. As such, coupler 104 also includes means for removably securing coupler 104 within passage 220 of a second barrier 102. In some embodiments, the means for securing the coupler within the passage of first projection portion 150 also acts as the means for removably securing the coupler within passage 220. For example, as shown in FIGS. 6 and 7, lobes 320 are also used to secure the coupler 104 within passage 220 of second projection portion 152 of second barrier 102B. To facilitate this, the cross sectional shape of coupler 104 at the position of lobes 320 substantially matches the shape of hole 248 formed by inner edge 252 of ledge 250 of second projection portion 152. As such, the cross sectional shape of each lobe 320 substantially matches the shape of ear-like sections 254 of hole 248 (FIG. 5). As a result, the portion of coupler 104 that includes lobes 320 can be passed through hole 248 of barrier 102B when lobes 320 are vertically aligned with hole sections 254.

Once lobes 320 are passed through sections 254 of hole 248, coupler 104 is then rotated about longitudinal axis 272 a quarter turn by the user manipulating gripping section 274 to the position shown in FIGS. 6 and 7. This causes lobes 320 to be received within recesses 258 of passage 220 of barrier 102B, with lobes 320 biasing against portions 260 of ledge 250. As a result, lobes 320 are prevented from being removed from passage 220 of barrier 102B by ledge 250. Barriers 102A and 102B are thus secured together by the combination of securing section 292 of coupler 104 biasing against outside face 166 of sidewall 164 of passage 162 of barrier 102A, and lobes 320 of coupler 104 biasing against ledge 250 in passage 220 of barrier 102B.

When it is desired to separate barriers 102A and 102B, coupler 104 is rotated a quarter turn about rotational axis 272 so that lobes 320 are again vertically aligned with hole sections 254 of barrier 102B. Coupler 104 is then raised so that lobes 320 pass back up through hole 248 of barrier 102B. First projection portion 150 of barrier 102A can then be lifted off of second projection portion 152 of barrier 102B, with coupler 104 remaining within passage 162 of barrier 102A.

Coupler 104 can be made of the same types of materials listed above with regard to barrier 102. Furthermore, similar to barrier 102, coupler 104 can be made by blow molding or another molding process, such as rotational molding, injection molding or die molding. In addition coupler 104 can be molded from the same piece of material as barrier 102, as noted above. In other embodiments, coupler 104 can be comprised of metal or other material.

The preceding discussion describes but one example of a means for securing a coupler within passage 162 of first projection portion 150 and a means for removably securing a coupler within passage 220 of a second barrier 102. It is appreciated that alternative arrangements can be used for one or both of the recited means. For example, FIGS. 14-17 depict various embodiments of alternative means for securing the coupler within passage 162 of first projection portion 150 and/or means for removably securing the coupler within passage 220.

FIGS. 14 and 15 respectively depict alternative couplers 330 and 350 that can be used with the present invention. Couplers 330 and 350 are similar to coupler 104, discussed above, except that in addition to lobes 320 that are used as the means for removably securing the coupler within passage 220, couplers 330 and 350 each also include a means for securing the coupler within passage 162 that is separate from the lobes 320.

For example, coupler 330 depicted in FIG. 14 includes a passage 332 extending transversally through shaft 270. Coupler 330 is inserted into passage 162 of barrier 102 until passage 332 passes beyond constricting portion 180. Once passage 332 is beyond constricting portion 180, a clevis pin 334 is inserted into passage 332. Clevis pin 334 comprises a head 336, with a shaft 338 extending therefrom to a spaced apart distal end 340. Distal end 340 of clevis pin 334 is inserted into passage 332 and shaft 338 is pushed through passage 332 until distal end 340 extends out from the other side of passage 332. Head 336 is sized so as to be larger than passage 332, thereby preventing head 336 from passing through passage 332. Once clevis pin 334 has been inserted into passage 332, a cotter pin 342 or the like is attached to distal end 340 of shaft 338, which extends out of passage 332. Head 336 and cotter pin 342 secure clevis pin 334 within passage 332. Clevis pin 334 is longer than the diameter of passage 162 at constricting portion 180. As such, once attached to shaft 270, clevis pin 334 prevents coupler 330 from being retracted out of passage 162 of barrier 102.

Instead of a passage extending transversally through shaft 270, coupler 350 depicted in FIGS. 15A and 15B includes an annular channel 352 formed so as to encircle shaft 270. Coupler 350 is inserted into passage 162 of barrier 102 until channel 352 passes beyond constricting portion 180. Once channel 352 is disposed beyond constricting portion 180, a retaining clip 354 is inserted into channel 352. As shown in FIG. 15B, retaining clip 354 is substantially c-shaped and is sized so as to be able to clip into channel 352 and remain fastened thereto, as is known in the art of retaining clips. Retaining clip 354 has an outer diameter larger than the diameter of passage 162 at constricting portion 180. As such, once attached to shaft 270, retaining clip 354 prevents coupler 350 from being retracted out of passage 162 of barrier 102.

FIG. 16 depicts an alternative embodiment of a coupler 360 in which lobes 320 are solely used as the means for securing the coupler within passage 162. Coupler 360 also includes a threaded portion 362 disposed at second end 314 of shaft 270. To receive coupler 360, a matching threaded socket or insert 364 is molded into passage 220 of barrier 102 or secured thereto. Threaded portion 362 can then be screwed into socket 364. As such, threaded portion 362 is another means for removably securing the coupler within passage 220.

FIG. 17 depicts another coupler 370 that includes alternative means for removably securing the coupler within passage 220. Instead of a threaded connection, coupler 370 includes two or more bayonet prongs 372 disposed at second end 314 of shaft 270 that are received within matching bayonet channels 374 formed in passage 220 of barrier 102. Bayonet prongs 372 can also double as the means for securing the coupler within passage 162, if desired.

Figure 18:
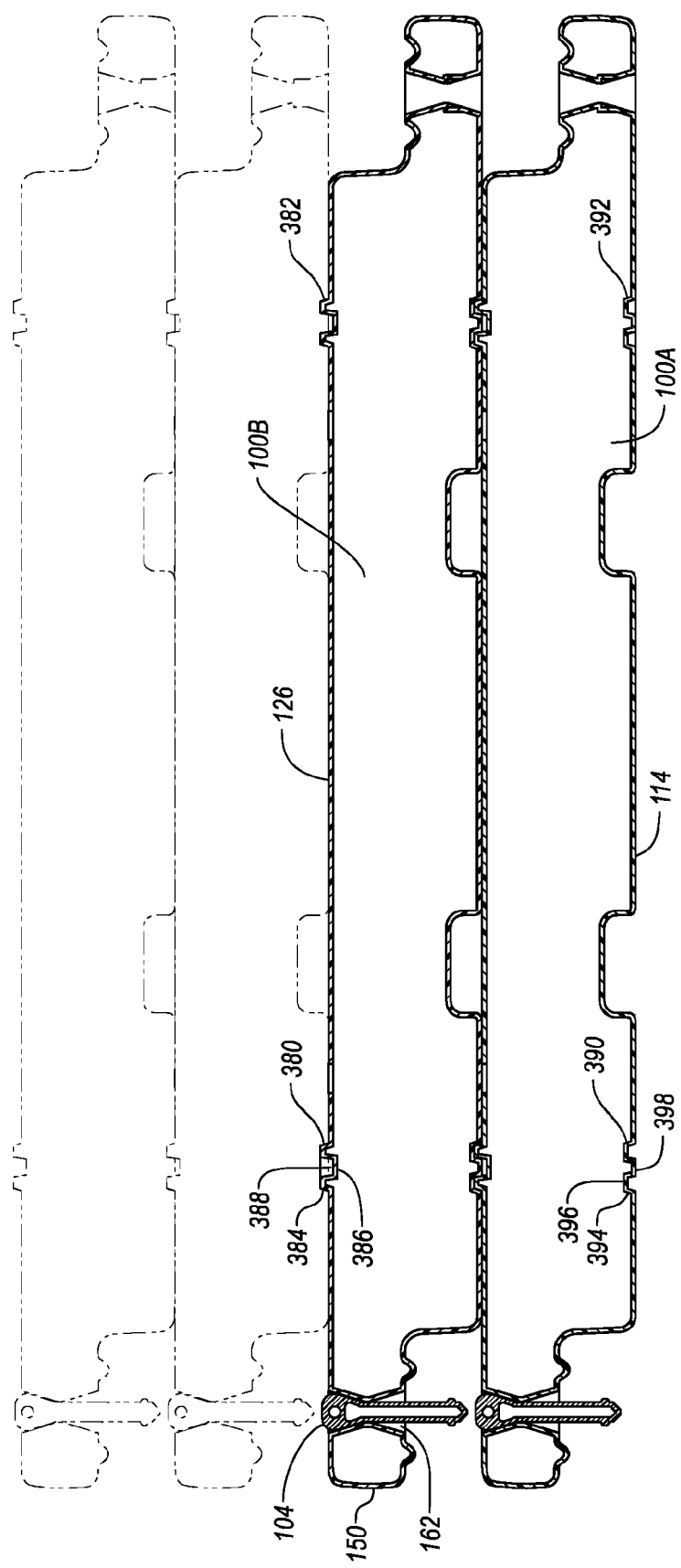
FIG. 18 is a cross-sectional front view of a pair of barrier assemblies shown in FIG. 1 stacked together for storage or transport.

In one embodiment of the present invention means are provided for mechanically mating a pair of barrier assemblies together for transport and/or storage. Turning to FIG. 18 in conjunction with FIGS. 1 and 2, by way of example and not by limitation, projecting from top wall 126 is a pair of spaced apart tenons 380 and 382. In the depicted embodiment, each tenon comprises an outwardly projecting ring 384 that terminates at an end wall 386 and encircles a cavity 388. A pair of spaced apart mortises 390 and 392 are formed on floor 114 in alignment with tenons 380 and 382. Tenons 380 and 382 are configured complementary to mortises 390 and 392, respectively. Each mortise 390 and 392 comprises an annular wall 392 inwardly projecting from floor 114 that terminates at a recessed end wall 396. A frustum 398 centered on end wall 396 projects out from end wall 396, terminating at or about the same plane as floor 114. The frustum 398 is sized and shaped to be able to be received within cavity 388 of the corresponding tenon 380 or 382 on top wall 126 of a separate identical barrier.

As depicted in FIG. 18, by seating a second barrier 102B on top of barrier 102A and mating top wall 126 of barrier 102A to floor 114 of barrier 102B, tenons 380 and 382 of barrier 102A are received within corresponding mortises 390 and 392, respectively, of barrier 102B. As such, barriers 102A and 102B are mated together. The overall mated structure has a substantially parallelepiped configuration. As a result, the mated barriers 102A and 102B are easily stacked for transport or storage. In alternative embodiments, tenons 380 and 382 and mortises 390 and 392 can be a variety of alternative configurations and need only be constructed so that they mate together. In some embodiments, end wall 386 of tenon 380 and/or 382 is omitted so that cavity 388 communicates with chamber 110. With cavity 388 open to chamber 110, a pole with a flag or the like mounted thereon can be inserted into chamber 110 through cavity 388 so that the flag will project up from barrier 102.

In the embodiment depicted, barriers 102A and 102B are configured so that when mated the top surface and bottom surface of the assembled barriers are substantially flat except for tenons 380 and 382 that receive mortises 390 and 392. This enables groups of assembled barriers to be easily and compactly stacked on top of and adjacent to one another for efficient storage and/or transport. Furthermore, as shown in FIG. 18, barriers 102A and 102B can be stacked together even when coupler 104 is positioned within passage 162 of first projection portion 150.

Depicted in FIGS. 19 and 20 is another alternative embodiment of a barrier 400 according to the present invention wherein like elements between barriers 102 and 400 are identified by like reference characters. Barriers 102 and 400 are substantially similar except that barrier 400 contains no engagers or pockets on either projection portions 150 or 152. The first projection portion 150 of barrier 400 can still overlap the second projection portion 152 of an identical barrier 400, but the engagement is strictly by use of coupler 104 (see FIG. 1) that extends through passages 162 and 220 of first and second projection portions 150 and 152, as previously discussed.

In view of the foregoing, it is appreciated that various embodiments of the present invention have a number of unique benefits. For example, select embodiments provide an engaging means in which one end of the barrier can overlap the end of another barrier, forming an almost continuous wall. By using engagers that are received within pockets, a solid connection is made between barriers that prevents unwanted movement or rotation of one barrier relative to the other. Furthermore, use of coupler 104 prevents unwanted separation of the barriers. By providing tenons and mortises on the barriers, select embodiments of the current invention allow for easier stacking. This saves time and money when transporting or storing the barriers. Furthermore, by permanently securing the coupler to the barrier, the coupler will remain with the barrier during transport and storage. This prevents separation of the coupler from the barrier when not in use, thereby preventing loss of the coupler. In addition, the coupler does not need to be separately tracked, as it always remains with the barrier; this can also greatly benefit the user.

A number of advantages are realized when used in an airport setting. For example, in some embodiments a portion of the side wall is sloped upward, which allows pilots to more easily see any reflective tape or coating on the sloped portion of the side wall, thus providing a safer airport construction environment. The low profile nature of the barriers helps to ensure that the barriers will not obstruct or damage planes while still providing necessary guidance. In addition, the barriers are of sufficient size so that when filled with a ballast, they will not be unintentionally moved by the propeller wash or jet blast of an aircraft. Furthermore, the coupler that is used to secure two barriers together is permanently securing to one of the barriers. As such, even if the coupler were to somehow become loose from connecting the two barriers together, the coupler would still remain secured to the original barrier, which would prevent the coupler from becoming dislodged and possibly causing damage to the aircraft.

Figure 21:
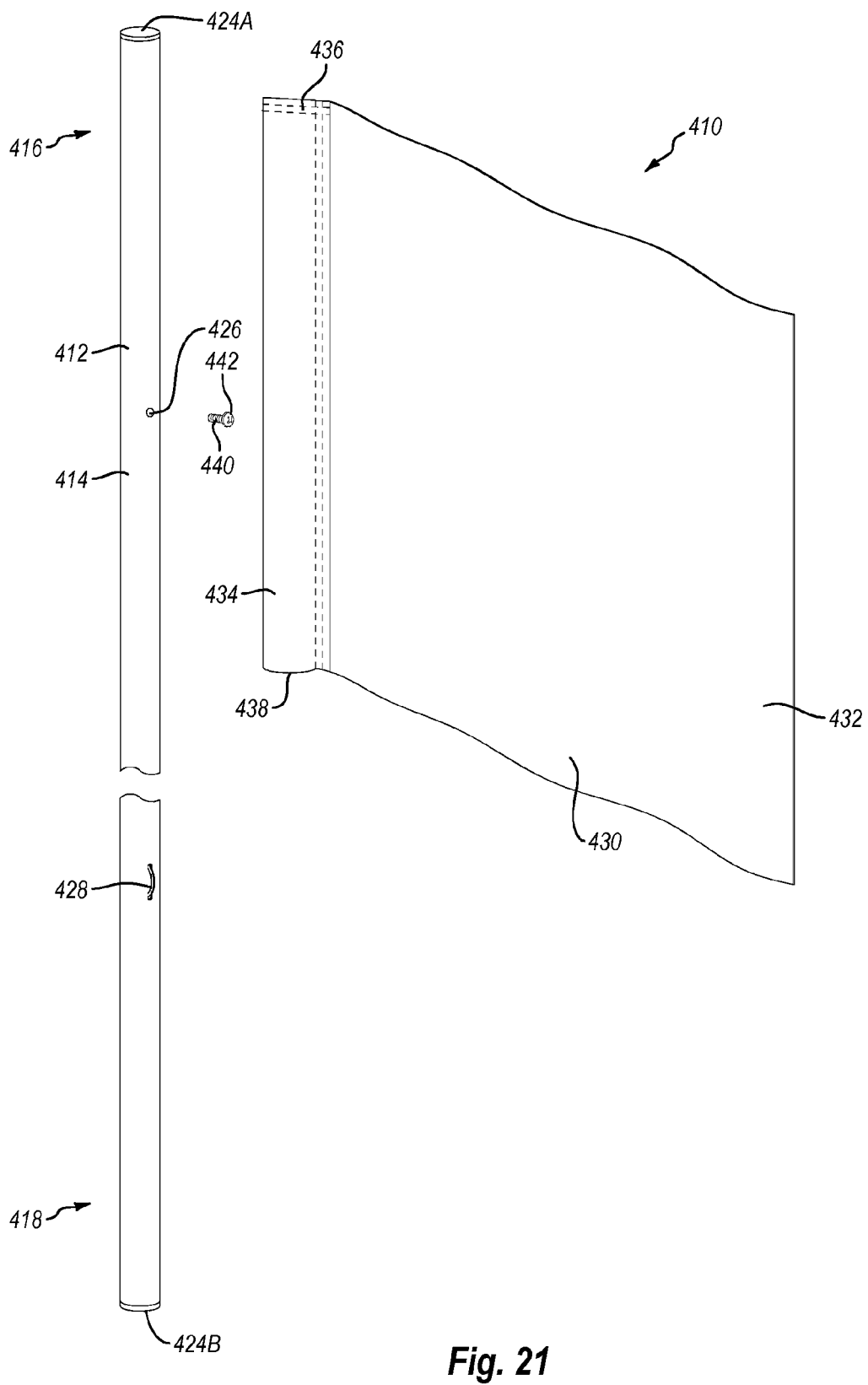
FIG. 21 is a perspective view of a flag assembly that can be used with the inventive barriers.
Figure 23:
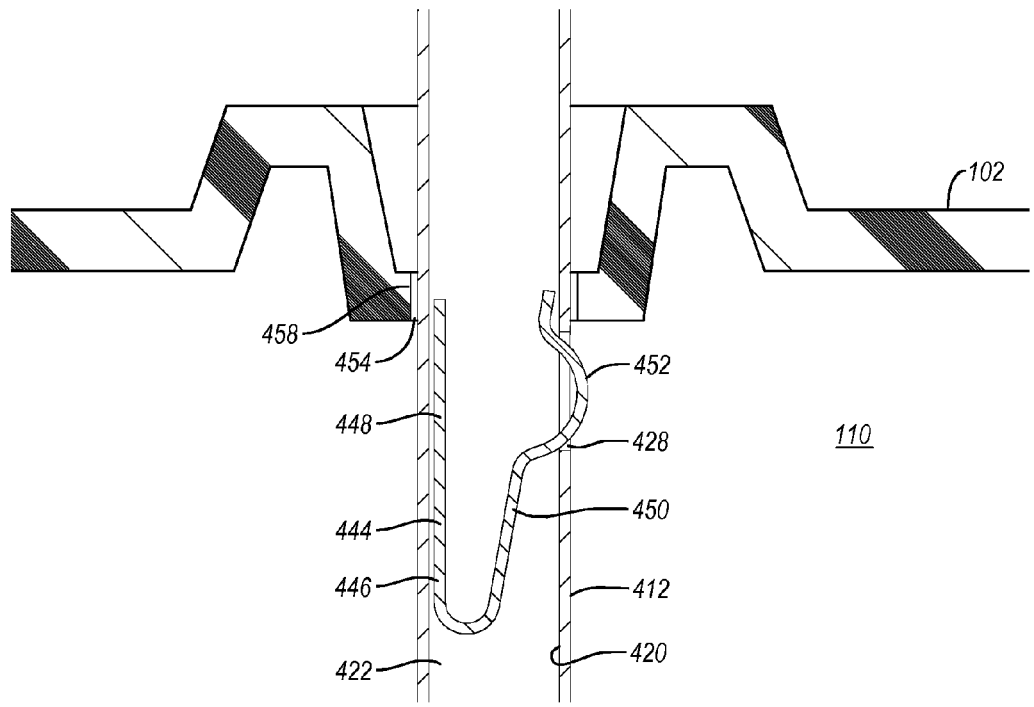
FIG. 23 is an enlarged view of the circled area 23 shown in FIG. 22.

Depicted in FIG. 21 is one embodiment of a flag assembly 410 that can be used with the barriers of the present invention. The flag assembly 410 comprises an elongated post 412 having an encircling side surface 414 that extends from a first end 416 to an opposing second end 418. As depicted in FIG. 23, post 412 is tubular and has an interior surface 420 that bounds a passageway 422 extending along the length thereof. Returning to FIG. 21, caps 424A and B can be mounted on opposing ends of post 412.

As will be discussed below in greater detail, extending through side surface 414 towards first end 416 is an attachment opening 426. In the depicted embodiment, attachment opening is shown as being circular but other shapes can also be used. Formed on side surface 414 towards second end 418 is a mounting opening 428. In the depicted embodiment, mounting opening 428 is showed as being an elongated slot. Again, other shapes can also be used. Post 412 typically has a length extending between opposing caps 424A and B in a range between about 14 inches to about 40 inches with about 20 inches to about 30 inches being more common. Other lengths can also be used.

Flag assembly 410 also includes a flag 430. Flag 430 is typically made of a flexible material in the form of a sheet, such as a polymeric sheet reinforced with fibers. Other materials can also be used. Flag 430 can be any desired size, shape, or color. Flag 430 includes a body portion 432 and a tubular sleeve portion 434. Sleeve portion 434 can be formed by simply folding over an edge of the flag material and stitching along the length thereof to form a sleeve. Stitching 436 can also be formed across an upper end of sleeve portion 434 so as to close off the upper end and thereby form a pocket 438. During use, pocket 438 can be slid over first end 416 of post 412 so as to attach flag 430 to post 412. A fastener 440, such as a screw having an enlarged head 442, can be punched through sleeve portion 434 and then secured into attachment opening 426, such as by being threaded therein, so that enlarged head 442 holds flag 430 onto post 412. Fastener 440 is useful in that when the barrier on which flag assembly 410 is mounted is located on an airport runway of taxiway, propeller wash or jet blast can try and blow flag 430 off of post 412. Fastener 440 precludes the unwanted removal of flag 430 but also enables the select removal and replacement of flag 430 once flag 430 has worn or for other reasons. This configuration enables the reuse of post 412 with different flags 430. Post 412 is typically made of metal or composite so that it has sufficient strength with withstand propeller wash or jet blast without failure. However, other materials can also be used.

Returning to FIG. 23, partially disposed within passageway 422 of post 412 is a retainer 444. It is appreciated that retainer 444 can come in a variety of different configurations. In the depicted embodiment, retainer 444 has a substantially U- or V-shaped body 446 that includes a first arm 448 and a second arm 450. Projecting from the end of second arm 450 is a U-shaped catch 452. Retainer 444 is formed from a resiliently flexible material. For example, retainer 444 can be formed from an elongated wire or ribbon of a resiliently flexile material, such as a metal. The material is bent into the desired shape during the manufacturing process so that when arms 448 and 450 are pressed together, the arms seek to resiliently move back their originally formed configuration. During assembly, arms 448 and 450 are resiliently pressed together and retainer 444 is slid into passageway 442 until catch 452 resiliently expands out into mounting opening 428. In this configuration, catch 452 is movable between an extended position as shown in FIG. 23 and a retracted position wherein catch 452 is pushed from outside of post 412 back towards passageway 422. In the retracted position, catch 452 resiliently urges back towards the extended position. That is, when catch 452 is released, it springs back to its extended position projecting out of mounting opening 428.

Figure 22:
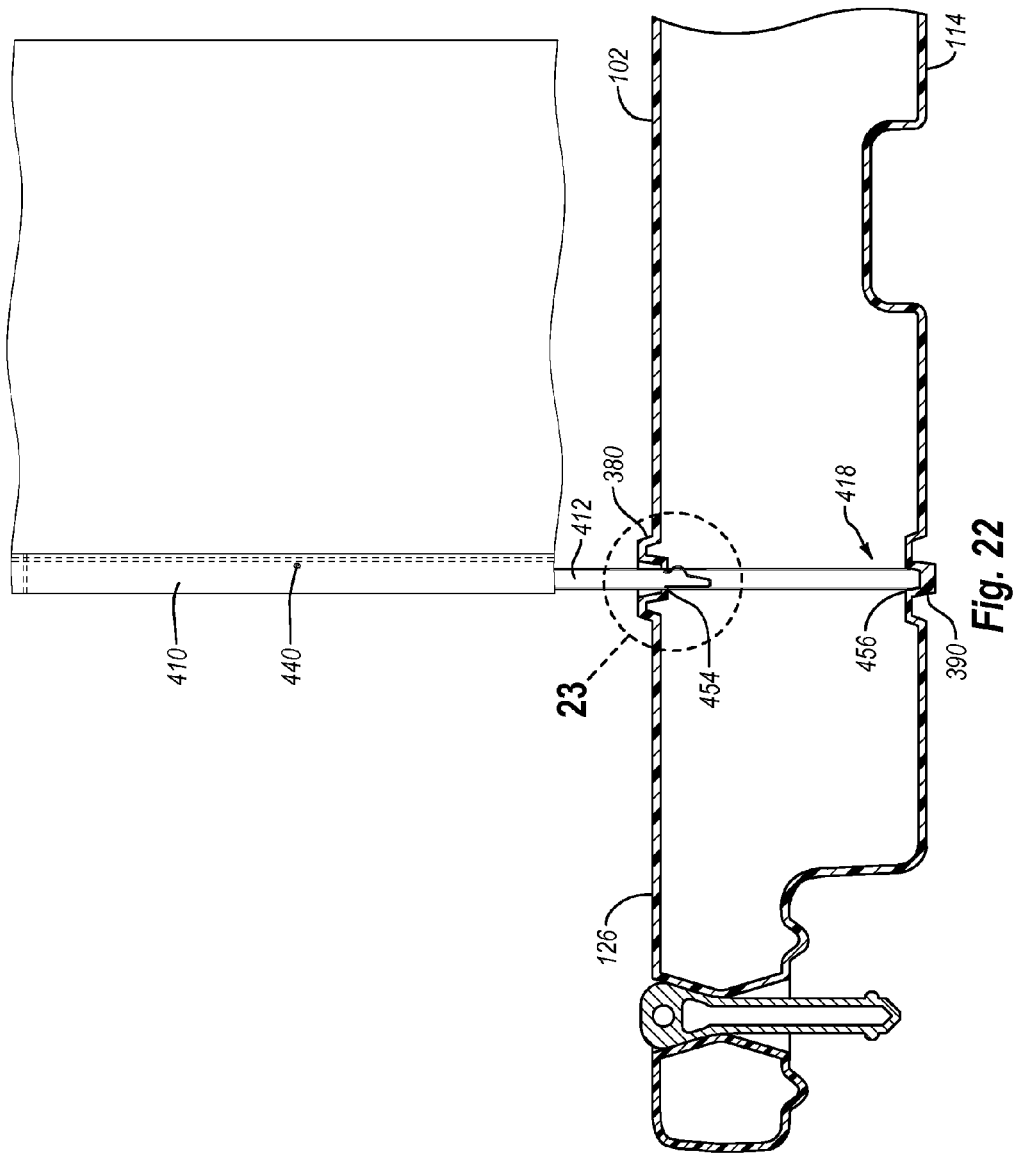
FIG. 22 is a partial cross sectional side view of the flag assembly shown in FIG. 21 mounted on a barrier.

As depicted in FIG. 22, flag assembly 410 can be used in association with barrier 102. To facilitate the mounting, an inlet 454 is formed on top wall 126 that is sized to receive second end 418 of post 412. In the depicted embodiment, inlet 454 is formed through the end wall of tenon 380. In this configuration, second end 418 of post 420 can be passed down through inlet 454 and then subsequently received within a pocket 456 formed on the interior surface of mortise 390. This configuration helps to maintain vertical alignment of flag assembly 410. In alternative embodiments, however, inlet 454 can be positioned at other locations along top wall 126 and need not be received within a pocket on floor 414. It is also appreciated that any number of inlets 454, such as 2, 3, or more, can be formed on top wall 126 so that multiple flag assemblies 410 can be mounted on barrier 102.

Turning to FIG. 23, inlet 454 is encircled by an annular lip 458. Inlet 454 is configured so that as second end 418 of post 412 is advanced down through inlet 454, catch 452 must strike against lip 458 causing catch 452 to compress into the retracted position until catch 452 passes by lip 458 at which point catch 452 resiliently expands back to the extended position. The rounded configuration of catch 452 enables the automatic movement catch 452 into the retracted position when sufficient force is applied to post 412. In the extended position within chamber 110, catch 452 precludes post 412 from being freely pulled out of inlet 454. That is, post 412 can only be removed by pull up on post 412 and exerting sufficient force to cause catch 452 to compress back into the retracted position so that catch 452 can pass through inlet 454. This resistance to removal caused by catch 452 prevents flag assembly 410 from being blown or sucked off of barrier 102 when flag assembly 410 is subject to propeller wash, jet blast, wind or other applied forces when the barrier and flag assembly are located on an airport taxiway or runway or at other locations. The unwanted separation of flag assembly 410 from barrier 102 can result in potentially obscuring the visibility of barrier 102 and can also result in flag assembly 410 becoming unwanted FOD on the runway or taxiway which could potentially be sucked into a jet engine or can cause other problems with adjacent aircraft.

One of the unique features of flag assembly 410 is that retainer 444 always remains secured to post 412 and thus there is no concern that retainer 444 could become unwanted FOD on the airport taxiway or runway. For example, if post 412 was mounted by a separate and distinct clamp or bolt, such clamp or bolt could potentially become loose or fail to be properly attached. As a result, the clamp or bolt could become unwanted FOD which is a potential concern for aircraft. The present design avoids this concern.

Figure 24:
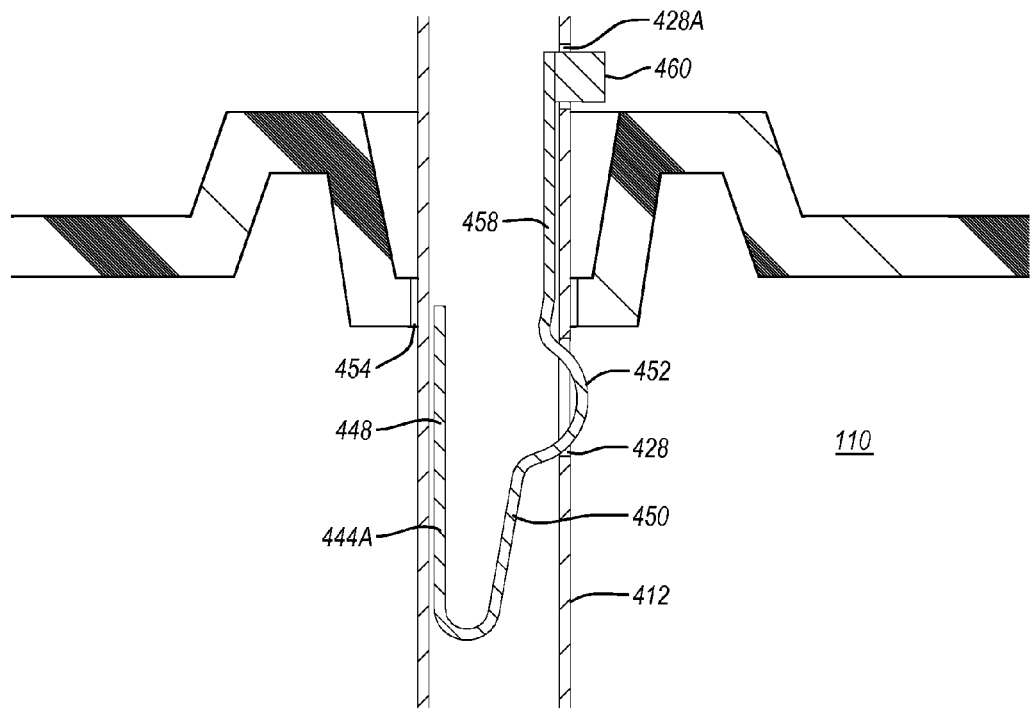
FIG. 24 is a cross sectional side view of an alternative retainer that can be used to retain the flag assembly on a barrier.

Depicted in FIG. 24 is a modified design of a retainer 444A which includes all of the elements of retainer 444. Retainer 444A, however, also includes an extension arm 458 that extends from catch 452 and a release 460 that projects out through a second mounting opening 428A on post 412. Release 460 is configured to be disposed outside of chamber 110 when catch 452 is disposed within chamber 110. In this configuration, an operator can manually depress release 460 which moves catch 452 either partially or completely into the retracted position so that it is easier to manually remove post 412 from inlet 454.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A barrier assembly comprising:
a barrier having an interior surface bounding a chamber and an opposing exterior surface, the chamber being adapted to hold a ballast, an inlet being formed on the barrier so as to communicate with the chamber; and
a flag assembly comprising:
a post having a first end and an opposing second end;
a flag disposed on the first end of the post; and
a retainer disposed on the post and comprising a catch radially outwardly projecting from the post, the catch being movable between an outwardly extended position and an inwardly retracted position, the catch resiliently urging toward the extended position when in the retracted position, the first end of the post being received within the inlet on the barrier so that the catch is disposed within the chamber in the extended position, the catch being configured so that the first end of the post cannot be pulled out through the inlet without moving the catch to the retracted position.

2. The barrier assembly as recited in claim 1, further comprising:
the post being tubular and having an interior surface that bounds a passage, a first opening being formed on a side of the post so as to communicate with the passage; and
the retainer being at least partially disposed within the passage of the post with the catch projecting out through the first opening on the post.

3. The barrier assembly as recited in claim 2, wherein the first opening comprises an elongated slot.

4. The barrier assembly as recited in claim 2, further comprising:
a second opening formed on the side of the post; and
the retainer comprising a release projecting out through the second opening, the release being configured so that manual manipulation of the release causes the catch to move between the extended and retracted position.

5. The barrier assembly as recited in claim 1, wherein the catch is rounded.

6. The barrier assembly as recited in claim 1, wherein the retainer comprises a U- or V-shaped body with the catch projecting therefrom.

7. The barrier assembly as recited in claim 1, wherein the retainer is comprises of a resiliently flexible wire or ribbon.

8. The barrier assembly as recited in claim 1, wherein the retainer remains secured to the post as the retainer moves between the retracted position and the extended position.

9. The barrier assembly as recited in claim 1, wherein the post is comprised of a metal.

10. The barrier assembly as recited in claim 1, further comprising:
the flag having a sleeve portion that is slidably received over the first end of the post; and
a fastener extends through a portion of the flag and is secured to the post so as to secure the flag to the post.

11. The barrier assembly as recited in claim 1, further comprising a pocket formed on the interior surface of the barrier, the second end of the post being received within the pocket.

12. A method for operating a barrier comprising:
inserting a second end of a flag post within an inlet formed on a barrier, the inlet being encircled by a lip, the barrier having a chamber to which the inlet communicates, the chamber being adapted to hold a ballast, a flag being mounted on a first end of the flag post; and
advancing the second end of the flag post into the inlet so that a catch outwardly projecting from the flag post is resiliently moved to a retracted position as the catch passes by the lip encircling the inlet and resiliently expands to the extended position after the catch is past the lip.

13. The method as recited in claim 12, further comprising placing the barrier on an airport runway or taxiway prior to inserting the flag post.

14. The method as recited in claim 12, further comprising:
depressing a release which moves the catch to the retracted position; and
removing the flag post from the inlet of the barrier after the catch is moved to the refracted position.

* * * * *